United States Patent [19]

Asami et al.

[11] Patent Number: 5,415,978
[45] Date of Patent: May 16, 1995

[54] IMAGE FORMING METHOD USING LASER BEAM

[75] Inventors: Masahiro Asami; Nobuharu Nozaki; Yoji Okazaki, all of Kanagawa, Japan

[73] Assignee: Fuji Photo Film Co., Ltd., Kanagawa, Japan

[21] Appl. No.: 181,255

[22] Filed: Jan. 13, 1994

[30] Foreign Application Priority Data

Jan. 14, 1993 [JP] Japan .................... 5-004789

[51] Int. Cl.⁶ .............................................. G03C 7/00
[52] U.S. Cl. ................................. 430/363; 430/383; 430/394; 430/494; 430/508; 430/581; 430/963; 430/945; 430/503
[58] Field of Search ............... 430/363, 383, 394, 494, 430/508, 503, 581, 963, 945

[56] References Cited

U.S. PATENT DOCUMENTS

| | | | |
|---|---|---|---|
| 4,619,892 | 10/1986 | Simpson et al. | |
| 4,770,978 | 9/1988 | Matsuzaka et al. | 430/363 |
| 4,943,517 | 7/1990 | Powers et al. | 430/363 |
| 4,956,702 | 9/1990 | McQuade et al. | |
| 4,980,549 | 12/1990 | Baldwin | 250/235 |
| 4,982,206 | 1/1991 | Kessler et al. | 346/108 |
| 5,057,405 | 10/1991 | Shiba et al. | 430/363 |
| 5,126,235 | 6/1992 | Hioki | 430/363 |

FOREIGN PATENT DOCUMENTS

| | | |
|---|---|---|
| 0018346 | 1/1988 | Japan . |
| 0019652 | 1/1988 | Japan . |
| 3141051 | 6/1988 | Japan .................... 430/36.3 |

OTHER PUBLICATIONS

The Theory of the Photographic Process, Fourth Edition, 1977, pp. 218–222, "Aggregation: General Characteristics", Macmillan Pub. Co.

*Primary Examiner*—Thomas R. Neville
*Attorney, Agent, or Firm*—Sughrue, Mion, Zinn, Macpeak & Seas

[57] ABSTRACT

An image is formed in a color photosensitive material through scanning exposure by using at least one semiconductor laser excited solid laser including a semiconductor laser, a non-linear optical element and means for controlling the temperature thereof as a light source for producing a laser beam. The laser beam is modulated by an external modulator in accordance with the image to be formed. Among the combinations of photosensitive layers and laser beams, at least two laser beam light sources are such that a laser beam has a wavelength falling within ±20 nm from the maximum wavelength in the spectral sensitivity distribution of the corresponding photosensitive layer. Each photosensitive layer has a spectral sensitivity distribution with a peak width of up to 40 nm. The method enables to form an image in a conventional silver halide photosensitive material having spectral sensitivity in the visible region using a cost effective light source, the resulting image having color generated to a satisfactory density, free of a density variation, and hence of high quality.

4 Claims, 7 Drawing Sheets

IMAGE FORMING METHOD USING LASER BEAM

BACKGROUND OF THE INVENTION

1. Field of the Invention

This invention relates to an image forming method for forming a reproduction image in a chemically and physically stable photosensitive material having spectral sensitivity in the visible region by subject it to scanning exposure with a laser beam. More particularly, it relates to an image forming method for recording an image of quality in a photosensitive material having a sharp spectral sensitivity distribution and spectral sensitivity in the visible region where a substantial sensitivity variation occurs with a wavelength variation of the laser beam, using a light source including an inexpensive semiconductor laser for emitting a steady laser beam free of a wavelength variation.

2. Prior Art

It is known to form an image in photographic silver halide photosensitive material using silver halide as a photosensitive element (simply referred to as photosensitive material, hereinafter) by scanning it with a laser beam or laser light modulated in accordance with a recording image signal, thereby achieving two-dimensional scanning exposure. This method is successful in producing a full color image at high precision in accordance with the image information given in the form of digital signals.

With the recent advance of laser diodes and semiconductor lasers (both referred to as LD, hereinafter), it becomes possible to fabricate a laser output apparatus of simple structure capable of producing a stable laser beam. There is a desire to have an image forming apparatus using such LD. In fact, various attempts have been made. For example, U.S. Pat. Nos. 4,619,892 and 4,956,702 disclose an image forming method by scanning a color photosensitive material having sensitivity in the infrared region with a laser beam emitted by LD.

Also recently developed were wavelength conversion elements using non-linear optical materials. Such elements can convert the wavelength of laser beams emitted from light sources. For example, Japanese Patent Application Kokai (JP-A) Nos. 08345/1988, 18346/1988, 19652/1988, and 19653/1988 disclose that a wavelength conversion element in the form of a so-called SHG element for generating a second harmonic is used to convert infrared light from LD into visible light, with which a conventional photosensitive material having spectral sensitivity in the visible region is scanned to form an image.

In these image forming techniques using laser beams, an image to be recorded is available as or converted into a digital image information signal and the photosensitive material is scanned with a laser beam in accordance with the image information for achieving two-dimensional scanning exposure. The image forming technique utilizing such digital image information enables synthesis of image information signals and various image processing including sharpness and correction in density and color of the original image information, affording various diversified types of image formation beyond the limit of image formation by the conventional photographic process.

The photosensitive material used in image formation as an image output medium is adapted to provide color reproduction by a subtractive color process using yellow, magenta and cyan dyes as three primary colors like conventional photographic color photosensitive material. It includes at least one layer for each of a yellow dye-forming silver halide photosensitive layer, a magenta dye-forming silver halide photosensitive layer, and a cyan dye-forming silver halide photosensitive layer formed on a support. In the above-mentioned image formation based on laser beam scanning exposure, each photosensitive layer is independently exposed with a laser beam having a wavelength corresponding to the color generating wavelength of the layer. Since generation of the three primary colors is independent for the respective colors, color generation can be freely controlled as compared with the general color photography using color negative film and color paper.

Moreover, the use of a LD as mentioned above as the laser beam light source has the advantages that the LD itself is less costly and the exposure quantity of each laser beam for image formation can be controlled by directly modulating the LD, ensuring the manufacture of a relatively inexpensive, compact apparatus capable of forming a high precision image. Many attempts have been made for producing images of quality, for example, full color images equivalent to conventional photographic images by using an LD as a light source for emitting a laser beam and subjecting a photosensitive material similar to conventional photographic photosensitive material to scanning exposure with the laser beam.

In forming an image in a photosensitive material by subjecting it to scanning exposure with a laser beam coming from an LD or similar light source, it is important to increase the sensitivity of the photosensitive material and the scanning speed of the laser beam in order to complete image formation at high sensitivity within a short time.

In general, silver halide used as a photosensitive element in photosensitive material is of the design that in order to impart sensitivity to light (laser beam) of a desired wavelength region, an organic dye molecule known as a spectral sensitizing dye is adsorbed to the silver halide to provide a spectral sensitivity distribution of a convex shape centering at the maximum photosensitive wavelength. Then to achieve image formation at a high speed, the photosensitive material or laser beam light source is preferably designed such that the oscillation wavelength of an LD used as the light source (or the wavelength of the laser beam) is incident with the spectral sensitivity maximum of the photosensitive material as closely as possible. From this aspect, we made investigations on image formation by scanning exposure with a laser beam emitting from LD, finding many problems.

When image formation by laser beam scanning exposure is carried out by using an LD having an oscillation wavelength approximate to the spectral sensitivity maximum of a photosensitive material and directly modulating the LD to control an exposure quantity, there often appear variable density streaks along the laser beam scanning direction. Such streaks become prominent particularly at gray color generated zones of intermediate density having a wide area, failing to achieve an image quality equivalent to conventional color photographs.

Where a boundary line between different density regions extends transverse to the primary scanning direction, a problem arises that if it is intended to generate color to a constant density, the density or the degree of color generation of a certain region varies depending on whether it adjoins a higher or lower density region.

Such a problem results from the temperature dependency of the output and oscillation wavelength of LD, that is, the droop phenomenon that the oscillation wavelength and output of a semiconductor laser vary during oscillation with a temperature change or the mode hopping phenomenon that the output wavelength varies discontinuously.

As previously mentioned, the photosensitive material has a convex shaped spectral sensitivity distribution. When the oscillation wavelength of LD (or the wavelength of a laser beam) is coincident with or in the vicinity of the maximum of this spectral sensitivity distribution, the photosensitive material inevitably lowers its color generation sensitivity with a shifting wavelength. If the oscillation wavelength of LD varies with a temperature change, the photosensitive material varies its sensitivity, resulting in a variation of color generation. Additionally, an output lowering of LD due to a temperature rise also causes the formed image to vary the density of color generation.

This tendency becomes prominent with general print use photosensitive material having sensitivity in the visible region as compared with photosensitive material having spectral sensitivity in the infrared region. The general print use photosensitive material having spectral sensitivity in the visible region is chemically and physically stable and easy to handle as compared with the photosensitive material having spectral sensitivity in the infrared region. As previously mentioned, a technique of converting the wavelength of a laser beam emitted from LD by means of a wavelength conversion element such as a SHG element has been established.

Accordingly, it is expected that by combining an LD and a wavelength conversion element as a light source and using a conventional photosensitive material having spectral sensitivity in the visible region as an image output medium, a color image forming system of simple construction, low cost and easy handling can be provided.

Nevertheless, because of the properties of the spectral sensitizing dye used, the general photosensitive material having spectral sensitivity in the visible region often has a spectral sensitivity peak curve which is sharper than that of the photosensitive material having spectral sensitivity in the infrared region. The above-mentioned problem, that is, the problem that the density of color generation varies with a wavelength shift due to the temperature dependency of LD becomes more prominent in this situation.

On the other hand, in forming a full color image by a laser beam in a photosensitive material using silver halide as a photosensitive element, a long development treatment time and a variation of color generation density by development treatment are considered to be limiting factors. Such limiting factors are being overcome by the recent advance of high silver chloride emulsion technology as typified by the technique disclosed in WO 87-04534. In this regard too, it is expected to apply conventional photosensitive material to the image formation technology based on digital image information using a laser beam.

However, if it is intended to form a pictorial image in a conventional photosensitive material including a high silver chloride emulsion by subjecting the photosensitive material to image exposure with a laser beam followed by rapid development treatment, the above-mentioned problem of density variation becomes more serious.

SUMMARY OF THE INVENTION

Therefore, an object of the present invention is to provide a novel and improved image forming method which has overcome the problems of the prior art techniques and which uses a low-cost light source of simple structure including a semiconductor laser, uses a conventional silver halide photosensitive material having spectral sensitivity in the visible region which is chemically and physically stable and easy to handle as an image output medium, permits an image of quality having a desired density of color generation and free of a density variation to be formed at high sensitivity, and permits rapid development treatment to follow exposure.

According to the present invention, there is provided a method for forming an image in a photosensitive material having at least one layer for each of yellow, magenta, and cyan dye-forming silver halide photosensitive layers on a support, by subjecting the photosensitive material to image exposure by scanning exposure using laser beams corresponding to the spectral sensitivity distribution of the respective photosensitive layers, followed by color development. At least one of the photosensitive layers in the photosensitive material has a spectral sensitivity distribution with a peak width of up to 40 nm. Among the combinations of the yellow, magenta, and cyan dye-forming silver halide photosensitive layers with laser beams used for exposure of the respective layers, a combination wherein a laser beam has a wavelength falling within ±20 nm from the maximum wavelength in the spectral sensitivity distribution of a photosensitive layer is present for at least two layers. At least one semiconductor laser excited solid laser having a semiconductor laser and a wavelength conversion element at least one of which is equipped with a temperature control means is used as a light source for producing the laser beam. The laser beam light source continuously emits a laser beam which is modulated by an optical modulator before it reaches the photosensitive material for exposure.

Preferably, the semiconductor laser excited solid laser has a wavelength conversion function built therein.

Preferably, at least one layer of the photosensitive layers of the photosensitive material is spectrally sensitized with a J-band type sensitizing dye.

Preferably, the color development is effected within 60 seconds from the end of image exposure by the laser beams and the overall color development step is completed within 120 seconds.

DESCRIPTION OF THE PREFERRED EMBODIMENTS

Figure 1:
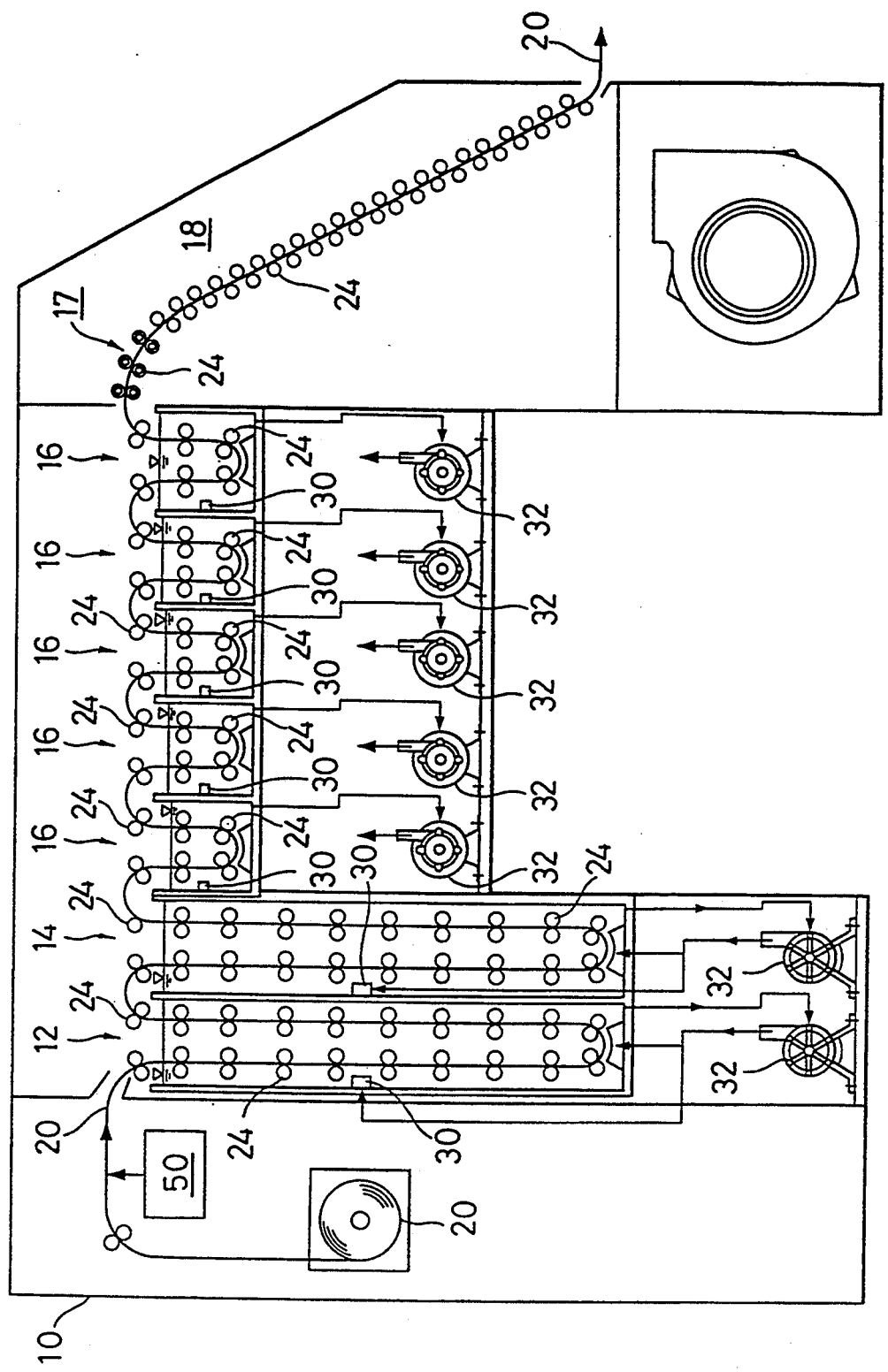
FIG. 1 is a schematic view of an image forming apparatus with which the image forming method of the invention is practiced.

The method for forming the image of the present invention is described hereinafter in greater detail.

In the image forming method of the present invention, a photosensitive material having at least one layer for each of a yellow dye-forming silver halide photosensitive layer, a magenta dye-forming silver halide photosensitive layer, and a cyan dye-forming silver halide photosensitive layer on a support is subjected to scanning exposure or raster scanning by using laser beams corresponding to the spectral sensitivity of the respective photosensitive layers, and then to color development, thereby forming an image in the photosensitive material.

The method of the invention employs a semiconductor laser excited solid laser having a semiconductor laser and a wavelength conversion element, at least one of which is equipped with a temperature control means, as a light source for emitting a laser beam having a wavelength falling within ±20 nm from the maximum wavelength in the spectral sensitivity distribution of the corresponding photosensitive layer. The light source continuously emits a laser beam which is modulated in accordance with the image to be formed by an external modulator such as an acoustooptic modulator (AOM), magnetooptic modulator and electrooptic modulator. The photosensitive material used herein includes photosensitive layers each having a spectral sensitivity distribution with a peak width of up to 40 nm.

In the technology disclosed in the above-referred U.S. Pat. Nos. 4,619,892 and 4,956,702, an image is formed in a photosensitive material in which a silver chlorobromide emulsion which is spectrally sensitized in the infrared region is combined with color couplers capable of forming yellow, magenta and cyan dyes through coupling reaction with an oxidant of an aromatic primary amine developing agent, while a laser beam emitting from a semiconductor laser is directly modulated. However, this technology cannot record an image in a conventional photosensitive material having spectral sensitivity in the visible region or eliminate a density variation in the formed image caused by the droop or mode hopping phenomenon associated with a temperature change of the semiconductor laser.

Similarly, the above-referred JP-A 08345/1988, 18346/1988, 19652/1988, and 19653/1988 disclose the technology that a wavelength conversion element in the form of a so-called SHG element for generating a second harmonic is used to convert infrared light from LD into visible light, with which a conventional photosensitive material having spectral sensitivity in the visible region is scanned for exposure to form an image.

The means for providing a laser beam of visible light as a second harmonic may be either of the following forms. For example, a semiconductor laser excited solid laser is constructed such that a solid laser rod containing a rare earth element such as neodymium is excited or pumped by a semiconductor laser. In one form, a bulk single crystal of a non-linear optical material is disposed in the resonator for converting the wavelength of the solid laser oscillated beam, thereby obtaining a second harmonic of the solid laser oscillated beam which is a laser beam of visible light.

In another form of the semiconductor laser excited solid laser in which a solid laser rod containing a rare earth element is pumped by a semiconductor laser, the solid laser oscillated beam is converted into a second harmonic by the solid laser's crystal itself, thereby obtaining a laser beam of visible light.

In such a light source which utilizes a wavelength conversion element such as SHG element to provide a second harmonic for producing a laser beam of visible light, the solid laser oscillated beam emitted by the semiconductor laser is once absorbed by the solid laser rod where it is converted into light of a predetermined wavelength while being laser oscillated. This enables to produce a laser beam of a predetermined wavelength without being affected by the oscillation wavelength of the semiconductor laser.

Regrettably, the semiconductor laser which is a laser beam oscillation source of a semiconductor laser excited solid laser generally shifts its oscillation wavelength at a rate of 0.3 nm/deg. On the other hand, the solid laser rod used in the semiconductor laser excited solid laser generally has an absorption wavelength in a narrow range of 1 nm to several nm so that if the oscillation wavelength of the semiconductor laser shifts, the solid laser rod lowers its oscillation output. Additionally, on wavelength conversion of the laser beam oscillated from the semiconductor laser, polarization mode competition noise will generate if the oscillation wavelength of the semiconductor laser includes a plurality of longitudinal modes.

For example, a laser beam light source including a semiconductor laser combined with a SHG wavelength conversion element as disclosed in JP-A 18346/1988, which is known as a direct modulation type, requires that the semiconductor laser be of single longitudinal mode and have very high wavelength stability since this system is to directly convert the wavelength of a laser beam emitted from the semiconductor laser and the SHG element has a permissible wavelength range as narrow as 1 nm to several tens of nanometer. Also since the semiconductor laser pumped solid laser of the direct modulation type cannot amplify a laser beam emitted from the semiconductor laser, a semiconductor laser of higher power must be used in order to provide a satisfactory laser beam output.

However, currently available high power laser diodes of single longitudinal/transverse mode are unstable in wavelength. They cannot eliminate an output variation and noise when used as wavelength conversion elements. That is, they cannot avoid an output lowering resulting from an output variation with a temperature change.

In contrast, according to the present invention, in order that a semiconductor laser excited solid laser in which a solid laser rod containing neodymium is pumped by a semiconductor laser produce a laser beam of a shorter wavelength, a bulk single crystal of a non-linear optical material is disposed in the resonator for converting the wavelength of the solid laser oscillated beam, whereby a second harmonic of the solid layer oscillated beam is obtained as a laser beam of visible light. The image forming method of the invention uses the thus constructed light source to record an image in a photosensitive material having spectral sensitivity in the visible region. While the semiconductor laser and/or the non-linear optical element as the wavelength conversion element during operation is maintained at a predetermined temperature by independent or common temperature control means, the light source is operated for continuous oscillation to emit a laser beam which is modulated by an external modulator in accordance with the image to be formed. There are used at least two laser beam light sources wherein each laser beam has a wavelength falling within the range of the maximum wavelength in the spectral sensitivity distribution of a corresponding photosensitive layer ±20 nm, and the photosensitive material wherein each photosensitive layer has a spectral sensitivity distribution with a peak width of up to 40 nm. All these factors combined are effective for eliminating the above-mentioned problems.

In a laser beam light source wherein a SHG element is used to generate a second harmonic to produce a laser beam of visible light as previously mentioned, the oscillation wavelength does not vary with a temperature change, but the output and wavelength of the semiconductor laser in the light source can vary with a temperature change, resulting in a laser beam output lowering with a temperature change.

In contrast, the image forming method of the present invention operates a semiconductor laser pumped solid laser so as to continue oscillation during image formation and controls the temperature of the semiconductor laser pumped solid laser and wavelength conversion element. As opposed to the direct modulation of a light source, the image forming method of the invention allows the laser beam light source to provide a constant output of oscillation without on/off and a sudden intensity change of laser oscillation. Additionally, since the semiconductor laser and/or the wavelength conversion element are maintained at a constant temperature, a laser beam of a constant power is available in a very stable manner without a droop or mode hopping phenomenon.

Since a photosensitive material in which at least one photosensitive layer has a spectral sensitivity distribution with a peak width of up to 40 nm and is preferably spectrally sensitized with a J-band sensitizing dye is used and at least two laser beams have a wavelength falling within the range of the maximum sensitivity wavelength of the corresponding photosensitive layers ±20 nm, image recording can be done in the high sensitivity region of the photosensitive material having high spectral sensitivity so that even with high speed exposure, an image having a satisfactory color generation density and hence of quality can be recorded.

Also since a laser beam of visible light is provided by a wavelength conversion element which generates a second harmonic, such as a SHG element, the laser beam is free of a wavelength variation so that an image can be formed in the photosensitive material having a sharp spectral sensitivity peak as mentioned above without a variation in color generation density which is otherwise caused by a wavelength variation of the light source.

Therefore, the image forming method of the present invention enables to form an image in a conventional photosensitive material having spectral sensitivity in the visible region using a cost effective optical system including a semiconductor laser, the resulting image having a satisfactory color generation density, free of a variable density, and hence of high quality.

The photosensitive material used as an image output medium in the image forming method of the present invention is a conventional photosensitive material commonly used in photography and having spectral sensitivity in the visible region. It has at least one layer for each of a yellow dye-forming silver halide photosensitive layer, a magenta dye-forming silver halide photosensitive layer, and a cyan dye-forming silver halide photosensitive layer on a support.

Like conventional photographic color photosensitive material, such photosensitive material is based on a mechanism of achieving color reproduction by a subtractive color process using yellow, magenta and cyan dyes as three primary colors. An image is formed from these dyes in the photosensitive material by subjecting the photosensitive material to imagewise exposure, developing the exposed silver halide grains with an aromatic primary amine developing agent, and reacting the resulting oxidant of the developing agent with a compound capable of forming a dye through coupling reaction, which is generally known as a coupler.

In short, the photosensitive layers in the photosensitive material contain silver halide grains as a photosensitive element and a color coupler capable of forming a dye through coupling reaction with an oxidant of an aromatic primary amine developing agent. Accordingly, the photosensitive material used herein is comprised of distinct photosensitive layers, at least one layer containing each of couplers capable of forming yellow, magenta, and cyan dyes typically used as the three primary colors.

To form each of the three primary colors singly, silver halide grains contained in each layer are spectrally sensitized so as to be sensitive to a distinct wavelength band. An image can be formed by exposing these layers with laser beams corresponding to the photosensitive wavelengths of the respective layers.

In the photosensitive material used herein, at least one, preferably at least two photosensitive layers have a spectral sensitivity distribution with a peak width of up to 40 nm. Such a photosensitive material is fully sensitive to a laser beam of a predetermined wavelength used for image formation or exposure so that an image color is generated to a sufficient density and hence, an image of high quality may be formed within a short exposure time and with a low exposure quantity. Any of well-known methods may be used for adjusting the spectral sensitivity distribution of photosensitive material so as to have a peak width of up to 40 nm although we recommend to use a photosensitive material which is spectrally sensitized with J-band type sensitizing dyes.

The peak width in the spectral sensitivity distribution used herein is defined as a wavelength width corresponding to a sensitivity which is lower by 0.4 logE than the maximum sensitivity of the spectral sensitivity distribution.

For determining the peak width, a photosensitive material must be first measured for spectral sensitivity distribution. The spectral sensitivity distribution is measured by providing light rows of the spectrum having different wavelengths, but providing an equal quantity of energy, exposing the photosensitive material with such light while varying the illuminance thereof wedgewise so as to enable sensitometry, and measuring the density of the thus color generated sample, thereby determining the sensitivity corresponding to each wavelength. From the thus obtained spectral sensitivity distribution, the peak width can be determined according to the above definition.

One known technique for sensitizing a silver halide emulsion in the visible region is to cause silver halide grains to adsorb a cyanine or merocyanine dye having absorption in a desired wavelength region, thereby accomplishing sensitization.

Such dyes which are known as spectral sensitizing dyes can impart sensitivity to silver halide in a wavelength region corresponding to a light absorption profile when adsorbed on the silver halide. Accordingly, the spectral sensitivity distribution can be adjusted by selecting the type and adsorption state of spectral sensitizing dye.

Known spectral sensitizing dyes practically used in the art include monomer type sensitizing dyes which adsorb to silver halide grains in a monomeric state and J-band type sensitizing dyes which adsorb to silver halide grains to form J-aggregates. The J-band type sensitizing dyes are effective for providing high sensitivity in a stable manner.

When the peak width of the spectral sensitivity distribution is compared between these two types, the J-band type sensitizing dyes generally provide a narrower peak width.

In the photosensitive material used herein, at least one, preferably at least two photosensitive layers should have a spectral sensitivity distribution with a peak width of up to 40 nm. When J-band type sensitizing dyes which can advantageously provide high sensitivity in a stable manner are used, there is a possibility that the peak width be reduced to 30 nm or less, and even 25 nm or less. Therefore, while high sensitivity is obtained in a stable manner, such a sharp spectral sensitivity distribution tends to give rise to inconvenient problems in laser scanning exposure as previously mentioned.

According to the present invention, at least one semiconductor laser excited solid laser having a semiconductor laser and a wavelength conversion element at least one of which is equipped with a temperature control means is used as a light source for emitting a laser beam. Preferably both of the semiconductor laser and wavelength conversion element are equipped with temperature control means, most preferably a common temperature control means. The laser beam light source continuously emits a laser beam which is modulated by an optical modulator before it reaches the photosensitive material for exposure. This enables to perform high-speed scanning exposure in a stable manner.

Now the photosensitive material used herein is described in detail.

The silver halide emulsion used in the photosensitive material according to the present invention contains silver halide grains preferably having a mean grain size of 0.1 to 2 μm (the mean grain size is a number average of grain sizes which are diameters of circles equivalent to the projected areas of grains). The silver halide emulsion is preferably monodisperse in that its grain size distribution has a coefficient of variation of up to 20%, more preferably up to 15% (the coefficient of variation is the standard deviation of a grain size distribution divided by the mean grain size). For the purpose of providing a wide latitude, it is preferred to use a blend of such monodisperse emulsions in a common layer or to coat such monodisperse emulsions in an overlapping manner.

The silver halide grains in the photographic emulsion may have a regular crystal form such as cube, octahedron, and tetradecahedron (14 sided), an irregular crystal form such as sphere and plate or a composite form of these crystal forms, or a mixture of different crystal form grains. In the practice of the invention, the grains should preferably contain at least 50%, more preferably at least 70%, most preferably at least 90% of grains having a regular crystal form.

Additionally, it is preferred to use an emulsion in which plate grains having an average aspect ratio (equivalent circle diameter/thickness) of at least 5, especially at least 8 occupy more than 50% of the entire projected area of grains.

Such a photographic emulsion, typically silver chlorobromide emulsion may be prepared by any conventional technique as disclosed in P. Grafkides, "Chimie et Physique Photographique", Paul Montel (1967), G. F. Duffin, "Photographic Emulsion Chemistry", Focal Press (1966), V. L., Zelikman et al., "Making and Coating Photographic Emulsion", Focal Press (1964). More particularly, acidic, neutral and ammonia methods may be used. The mode of reacting a soluble silver salt with a soluble halide may be single jet, double jet or a combination thereof. It is also employable to form grains in the presence of excess silver ions, which is known as reverse mixing method. One special type of the double jet technique is by maintaining constant the pAg of a liquid phase in which silver halide is created, which is known as a controlled double jet technique. This technique results in a silver halide emulsion of grains having a regular crystalline form and a nearly uniform particle size.

In the photographic silver halide emulsion, any of various polyvalent metal impurity ions may be introduced during the step of forming or physically ripening silver halide grains. Examples of compounds used for such purpose include salts of cadmium, zinc, lead, copper and thallium, salts or complex salts of rhenium belonging to Group VII, and salts or complex salts of iron, ruthenium, rhodium, palladium, osmium, iridium and platinum belonging to Group VIII. The elements of Group VIII are especially preferred. The amount of these compounds added may vary over a wide range depending on a particular purpose although it is preferably $10^{-9}$ to $10^{-2}$ mol per mol of silver halide.

Also in the photographic silver halide emulsion, any of various polyvalent anions may be introduced during the step of forming or physically ripening silver halide grains. Exemplary polyvalent anions which can be introduced are sulfur, selenium, and tellurium. Such an anion can be introduced by effecting formation or physical ripening of silver halide grains in the co-presence of a compound capable of releasing the anion. The amount of these compounds added may vary over a wide range depending on a particular purpose although it is preferably $10^{-8}$ to $10^{-2}$ mol per mol of silver halide.

In the photosensitive material used in the present invention, the silver halide emulsion is generally chemically and spectrally sensitized.

For chemical sensitization, sulfur sensitization as typified by the addition of unstable sulfur group compounds, selenium or tellurium sensitization, noble metal sensitization as typified by gold sensitization and reductive sensitization may be used alone or in combination.

The compounds used for chemical sensitization are described in U.S. Pat. Nos. 1,574,944, 1,623,499, 2,399,083, 3,297,446, 3,297,447, 3,320,069, 3,408,196, 3,408,197, 3,442,653, 3,402,670, and 3,591,385, French Patent Nos. 2,093,038 and 2,093,209, JP-B 34491/1977, 34492/1977, 00295/1978, and 22090/1982, JP-A 180536/1984, 185330/1984, 181337/1984, 187338/1984, 192241/1984, 150046/1985, 151637/1985, and 246738/1986, UKP 255,846 and 861,984, as well as H. E. Spencer et al., Journal of Photographic Science, Vol. 31, 158–169 (1983). In addition to the unstable sulfur group compounds, those compounds described in JP-A 215272/1987, pages 18–22 are preferably used.

Spectral sensitization is effected on the photographic silver halide emulsion for imparting spectral sensitivity in a desired light wavelength region to the emulsion. In the practice of the invention, spectral sensitization is preferably carried out by adding a dye having absorption in an intended wavelength region where spectral sensitivity is to be imparted, that is, a spectral sensitizing dye.

Any of various well-known spectral sensitizing dyes may be used. Conventional sensitizing dyes are useful, for example, the dyes described in F. M. Harmer, "Heterocyclic compounds-Cyanine dyes and related compounds", John Wiley & Sons, New York, London, 1964. Exemplary compounds and procedures for spectral sensitization are illustrated in the above-referred JP-A 215277/1987, pages 22–38.

In the silver halide emulsion used herein, various compounds and precursors thereof may be added for the purpose of preventing fog during preparation, storage and photographic processing of the photosensitive material or stabilizing photographic performance. Exemplary, preferred such compounds are described in the above-referred JP-A 215272/1987, pages 39–72.

The silver halide emulsion used herein is preferably of the surface latent image type wherein latent images are mainly formed on the grain surface.

The silver halide emulsion used in the photosensitive material according to the invention may be of silver chlorobromide, silver chloroiodide and silver chloroiodobromide containing at least 90 mol % of silver chloride, and silver chloride. Preferred for rapid processing are silver chlorobromide, silver chloroiodide and silver chloroiodobromide containing at least 95 mol %, especially at least 98 mol % of silver chloride, and silver chloride. Although it is generally believed that silver halide grains substantially free of silver iodide are preferred when rapid processing is intended, it is rather preferred to contain a trace amount (of the order of 0.01 to 2 mol %) of iodine when panchromatic or infrared sensitization is effected.

In the photosensitive material used herein, for the purpose of improving the sharpness of images, dyes which can be decolored upon processing (especially oxonol dyes) as described in EP 03 37 490 A2, pages 27–76 are preferably added to hydrophilic colloid layers such that the photosensitive material may have an optical reflection density at 680 nm of at least 0.7. Alternatively, at least 12% by weight, especially at least 14% by weight of titanium oxide surface treated with dihydric to tetrahydric alcohols (e.g., trimethylol ethane) is preferably contained in a water resistant resin layers of the support.

The photosensitive material used herein employs high-boiling organic solvents for dissolving photographic additives such as cyan, magenta and yellow couplers. There may be used any of organic solvents which have a melting point of lower than 100° C. and a boiling point of higher than 100° C., are immiscible with water, and are good solvents for couplers. Preferred high-boiling organic solvents have a melting point of lower than 80° C. and a boiling point of higher than 160° C., especially higher than 170° C. For the detail of these high-boiling organic solvents, reference is made to JP-A 215272/1987, pages 137–144.

Also, the cyan, magenta and yellow couplers may be used by impregnating loadable latex polymers (see U.S. Pat. No. 4,203,716) with the couplers in the presence or absence of the high-boiling organic solvent or by dissolving the couplers in water-insoluble, organic solvent-soluble polymers, and emulsifying and dispersing the solution in a hydrophilic colloid aqueous solution. Preferably, the homopolymers and copolymers described in U.S. Pat. No. 4,857,449, columns 7–15 and WO 88/00723, pages 12–30 are used. The use of methacrylate and acrylamide polymers, especially acrylamide polymers is recommended for color image stabilization.

In the photosensitive material, compounds for improving color image storability as described in EP 02 77 589 A2 are preferably used together with the aforementioned couplers, especially pyrazoloazole couplers. Useful are a compound (F) which chemically bonds with the aromatic amine color developing agent which is retained after color development, thereby forming a chemically inert, substantially colorless compound and a compound (G) which chemically bonds with the oxidant of aromatic amine color developing agent which is retained after color development, thereby forming a chemically inert, substantially colorless compound. Compounds (F) and (G) may be used alone or in admixture for preventing stain generation or other side effects due to a color developing dye formed by reaction of the coupler with a residual color developing agent or oxidant thereof retained in the film during shelf storage after processing.

In the photosensitive material, anti-bacterial agents as described in JP-A 271247/1988 are preferably added for preventing fungi and bacteria from growing in the hydrophilic colloid layer to deteriorate the image.

The support used in the photosensitive material according to the present invention may be a white polyester base support or a support having a white pigment-containing layer on the same side as the silver halide emulsion layers for display purposes. For improving sharpness, the support is preferably coated with an anti-halation layer on the same side as or on the opposite side to the silver halide emulsion layers. Also preferably the support preferably has a transmission density of 0.35 to 0.8 so that the display can be viewed with either reflecting or transmitting light.

In the practice of the invention, the photosensitive material is basically subject to scanning exposure with laser beams. The exposure time per pixel is preferably up to $10^{-3}$ sec., especially up to $10^{-4}$ sec.

After exposure, the photosensitive material is subject to conventional black-and-white or color development. In the case of color photosensitive material, color development is preferably followed by bleach-fixation for rapid processing purposes. Particularly when a high silver chloride content emulsion as mentioned above is used, the bleach-fixing solution is preferably below about pH 6.5, more preferably below about pH 6 for facilitating desilvering and other purposes.

With respect to the silver halide emulsion, other substances (such as additives) and photographic constituent layers (including layer arrangement) applied to the photosensitive material used in the present invention and a method for processing the photosensitive material and processing chemicals used therein, reference is made to the patents described in the following Reference List, especially EP 03 55 660 A2 (JP-A 139544/1990).

having a silver chloride content of higher than 90 mol %, the method described in JP-A 207250/1990, pages

Reference List

| Photographic element | JP-A 215272/1987 | JP-A 33144/1990 | EP 03 55 660 A2 |
|---|---|---|---|
| Silver halide emulsion | P10/RU/L6-P12/LL/L5 P12/RL/L17-P13/LU/L17 | P28/RU/L16-P29/RL/L11 P30/L2-5 | P45/L53-P47/L3 P47/L20-22 |
| Silver halide solvent | P12/LL/L6-14 P13/LU/L18-P18/LL/L20 | — | — |
| Chemical sensitizer | P12/LL/L18-RL/L16 P18/RL/L1-P22/RU/L12 | P29/RL/L12-20 | P47/L4-9 |
| Spectral sensitizer (spectral sensitization) | P22/RU/L13-P38/L20 | P30/LU/L1-13 | P47/L10-15 |
| Emulsion stabilizer | P39/LU/L1-P72/RU/L20 | P30/LU/L14-RU/L1 | P47/L16-19 |
| Development promoter | P72/LL/L1-P91/RU/L3 | — | |
| Color coupler (cyan, magenta and yellow couplers) | P91/RU/L4-P121/LU/L6 | P3/RU/L14-P18/LU/L20 P30/RU/L6-P35/RL/L11 | P4/L15-27 P5/L30-P28/L20 P45/L29-31 P47/L23-P63/L50 |
| Color generation augmenter | P121/LU/L7-P125/RU/L1 | — | — |
| UV absorber | P125/RU/L2-P127/LL/L20 | P37/RL/L14-P38/LU/L11 | P65/L22-31 |
| Anti-fading agent (image stabilizer) | P127/RL/L1-P137/LL/L8 | P36/RU/L12-P37/LU/L19 | P4/L30-P5/L23 P29/L1-P45/L25 P45/L33-40 P65/L2-21 |
| High and/or low boiling organic solvent | P137/LL/L9-P144/RU/L20 | P35/RL/L14-P36/LU/L17 | P64/L1-51 |
| Dispersion method of photographic additives | P144/LL/L1-P146/RU/L7 | P27/RL/L10-P28/LU/L20 P35/RL/L12-P36/RU/L7 | P63/L51-P64/L56 |
| Hardener | P146/RU/L8-P155/LL/L4 | — | — |
| Developing agent precursor | P155/LL/L5-RL/L2 | — | — |
| DIR | P155/RL/L3-9 | — | — |
| Support | P155/RL/L19-P156/LU/L14 | P38/RU/L18-p39/LU/L3 | P66/L29-P67/L13 |
| Photosensitive layer arrangement | P156/LU/L15-RL/L14 | P28/RU/L1-15 | P45/L41-52 |
| Dye | P156/RL/L15-P184/RL/L20 | P38/LU/L12-RU/L7 | P66/L18-22 |
| Anti-amalgamation agent | P185/LU/L1-P188/RL/L3 | P36/RU/L8-11 | P64/L57-P65/L1 |
| Gradation modifier | P188/RL/L4-8 | — | — |
| Anti-staining agent | P188/RL/L9-P193/RL/L10 | P37/LU/L20-RL/L13 | P65/L32-P66/L17 |
| Surfactant | P201/LL/L1-P210/RU/L20 | P18/RU/L1-P24/RL/L20 P27/LL/L11-RL/L9 | — |
| Fluorinated compound (as antistatic agent, coating aid, lubricant, anti-sticking agent, etc.) | P210/LL/L1-P222/LL/L5 | P25/LU/L1-P27/RL/L9 | — |
| Binder (hydrophilic colloid) | P222/LL/L6-P225/LU/L20 | P38/RU/L8-18 | P66/L23-28 |
| Thickener | P225/RU/L1-P227/RU/L2 | — | — |
| Antistatic agent | P227/RU/L3-P230/LU/L1 | — | — |
| Polymer latex | P230/LU/L2-P239/RL/L20 | — | — |
| Matte agent | P240/LU/L1-P240/RU/L20 | — | — |
| Photographic processing method (processing steps and additives) | P3/RU/L7-P10/RU/L5 | P39/LU/L4-P42/LU/L20 | P67/L14-P69/L28 |

Note:
(1) Abbreviations are: P is page, LU is left upper column, RU is right upper column, LL is left lower column, RL is right lower column, and L is line. For example, P10/RU/L6 means page 10, right upper column, line 6.
(2) JP-A 215272/1987 cited herein includes the amendment dated March 16, 1987.

In addition to the above-listed color couplers, other preferred yellow couplers are the yellow couplers described in JP-A 231451/1988, 123047/1988, and 241547/1988, and the short wavelength yellow couplers described in JP-A 73499/1989, 213648/1989, and 250944/1989.

Useful cyan couplers include the diphenylimidazole cyan couplers described in JP-A 33144/1990, the 3-hydroxypyridine cyan couplers described in EP 03 33 185 A2, typically coupler (42) which is a four equivalent coupler converted to a two equivalent form by attaching a chlorine coupling-off group, and couplers (6) and (9), and the cyclic active methylene cyan couplers described in JP-A 32260/1989, typically exemplary couplers 3, 8 and 34.

For processing a silver halide color photosensitive material using a high silver chloride content emulsion 27-34 is preferably applied.

Referring to FIGS. 1 to 6, there is illustrated one exemplary image forming apparatus for carrying the image forming method of the present invention into practice. The present invention is not limited to the illustrated embodiment.

FIG. 1 schematically illustrates one exemplary image forming apparatus for processing the photosensitive material defined above. The apparatus is designed to form an image in the photosensitive material by sequentially performing scanning exposure using laser beams each having a wavelength corresponding to the spectral sensitivity of corresponding one of a yellow dye-forming silver halide photosensitive layer (yellow dye-forming layer), a magenta dye-forming silver halide photosensitive layer (magenta dye-forming layer), and a cyan dye-forming silver halide photosensitive layer (cyan dye-forming layer) adapted to form the yellow, magenta and cyan dyes, respectively, development, bleach-fixation, water washing, and drying.

To this end, the image forming apparatus generally designated at 10 in FIG. 1 includes an exposure section 50, a developing tank 12, a bleach-fixing tank 14, a washing tank 16, a water removal section 17, and a drying section 18 arranged in series to define a path along which the photosensitive material travels. Moving forward along the path, the photosensitive material is exposed, developed, bleach-fixed, washed and dried. Finally the photosensitive material is discharged out of the apparatus 10.

Figure 2:
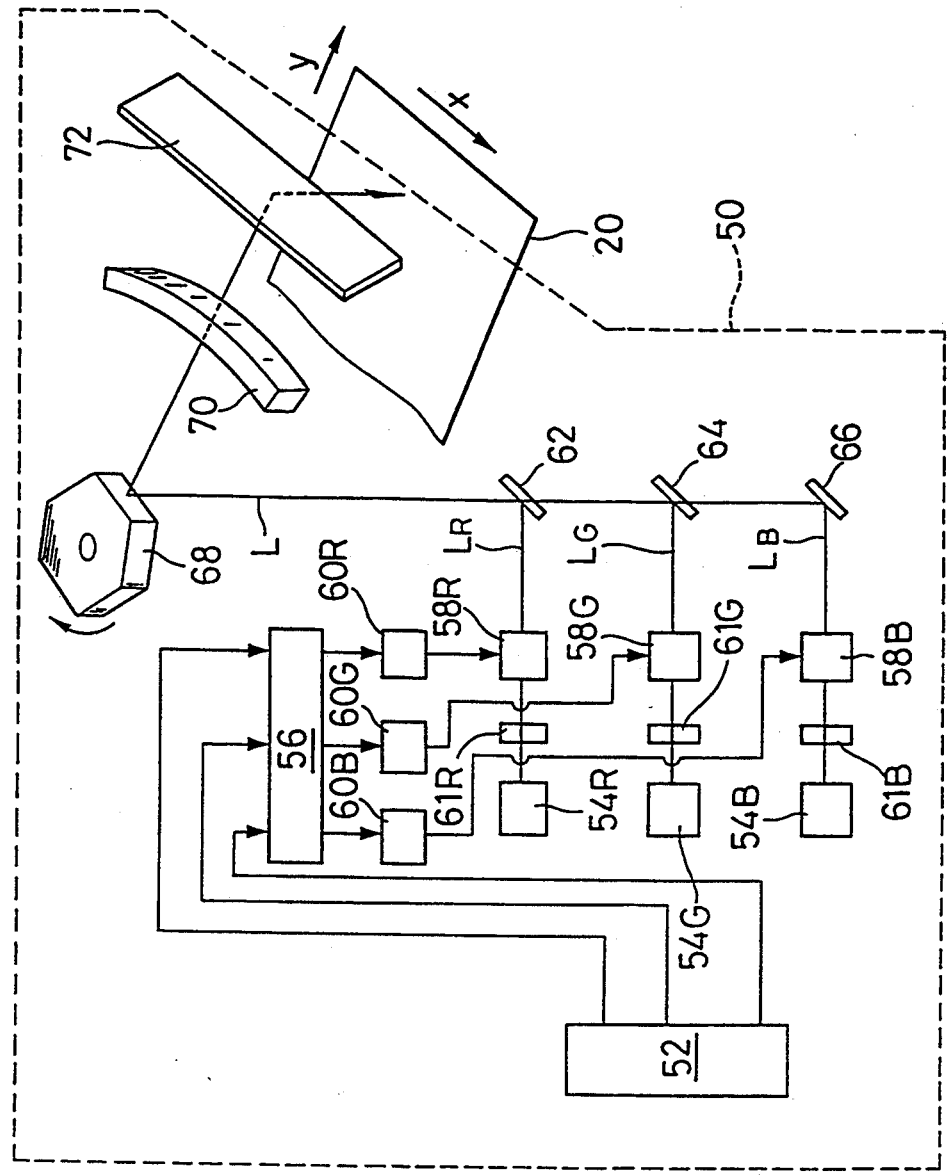
FIG. 2 is a schematic view of an exposure section in the image forming apparatus of FIG. 1.

FIG. 2 schematically illustrates the exposure section 50. The exposure section 50 is designed to emit three laser beams each having a wavelength corresponding to the spectral sensitivity of one corresponding photosensitive layer of a blue (B) sensitive layer, a green (G) sensitive layer, and a red (R) sensitive layer adapted to form yellow, magenta and cyan dyes, respectively, in the photosensitive material 20, to modulate the laser beams in accordance with an image to be recorded, to combine the three laser beams into one laser beam, and to deflect the resultant laser beam in a primary scanning direction (which is the direction of arrow x in FIG. 2), thereby achieving two-dimensional scanning exposure on the photosensitive material 20 which is scanned and fed in a secondary scanning direction (which is the direction of arrow y in FIG. 2) substantially perpendicular to the primary scanning direction.

The exposure section 50 includes an exposure control circuit 52 which receives a signal indicative of the information about an image to be formed from an image information source in the form of an image reader or host computer, performs various functions including D/A conversion, exposure correction, and signal processing in response to the image information signal, computes the exposures of pixels along a line for each color, determines the modulation quantities for each light source 54 (54R, 54G, 54B) corresponding to the exposures of pixels along a line, and delivers the resulting image information signals to a non-linear amplifier 56.

The non-linear amplifier 56 is mainly for compensating for the non-linearity of an acoustooptic modulator (AOM) 58. Thus the non-linear amplifier 56 corrects image information signals and delivers them to drive circuits 60 (60R, 60G, 60B) of the respective AOMs 58 to drive the AOMs 58 (58R, 58G, 58B).

The light source 54 includes laser beam light sources for emitting light of narrow band wavelength for exposing the R, G and B sensitive layers of the photosensitive material 20 therewith. More particularly, the light source 54 includes a light source 54R adapted to emit a laser beam $L_R$ for exposing the R sensitive layer of the photosensitive material 20 therewith, a light source 54G adapted to emit a laser beam $L_G$ for exposing the G sensitive layer of the photosensitive material 20 therewith, and a light source 54B adapted to emit a laser beam $L_B$ for exposing the B sensitive layer of the photosensitive material 20 therewith, respectively in a constant power.

Each light source 54 used in the image forming method of the present invention is a semiconductor laser excited solid laser having a semiconductor laser and a wavelength conversion element which are equipped with temperature control means. Among the combinations of the photosensitive layers with the laser beams, there are included at least two combinations wherein a laser beam L has a wavelength falling within ±20 nm from the maximum wavelength in the spectral sensitivity distribution of a photosensitive layer. Each light source 54 is provided with a temperature control means for maintaining the temperature of the light source constant. The light sources 54 will be described later in detail.

The light sources 54 emit laser beams $L_R$, $L_G$, and $L_B$ which are collimated into parallel light rays by collimator lenses 61 (61R, 61G, 61B).

The laser beams $L_R$, $L_G$, and $L_B$ in the form of parallel light rays through collimator lenses 61 then enter the corresponding AOMs 58 (58R, 58G, 58B). Since the respective AOMs 58 are driven in accordance with the image (linear image) to be recorded, the intensities of the laser beams incident on the respective AOMs 58 are modulated in accordance with the image to be recorded.

Although the image forming method of the invention is intended to modulate the laser beams in accordance with an image to be recorded by means of external modulators such as AOMs 58 rather than directly modulating the laser beam light sources, the optical modulators used herein are not limited to the AOMs 58 in the illustrated embodiment and any of various well-known optical modulators such as magnetooptical modulators and electro-optical modulators is equally applicable.

The laser beams modulated by the AOMs 58 are synthesized into a single laser beam L by a laser beam synthesis system including dichroic mirrors 62, 64 and a mirror 66. In this laser beam synthesis system, the dichroic mirror 62 reflects only a laser beam having the wavelength of the laser beam $L_R$, and transmits other laser beams, and the dichroic mirror 64 reflects only a laser beam having the wavelength of the laser beam $L_G$, and transmits other laser beams. Then the three laser beams incident on the respective mirrors are synthesized into a single laser beam L.

The resultant laser beam L then enters a polygon mirror or optical deflector 68 by which the beam is deflected in the primary scanning direction of arrow x in FIG. 2.

The laser beam L being deflected in the primary scanning direction is properly focus adjusted through a f$\theta$ lens 70 so as to define a beam spot of a predetermined diameter at a predetermined position on the photosensitive material 20 and reflected by a down-facing mirror 72 into a predetermined direction whereby the laser beam L strikes the photosensitive material 20 at the predetermined position which is supported at the predetermined exposure position and scanningly fed in the secondary (transverse) scanning direction, thereby defining a scanning line. In this way, the photosensitive material 20 undergoes scanning exposure.

Figure 3:
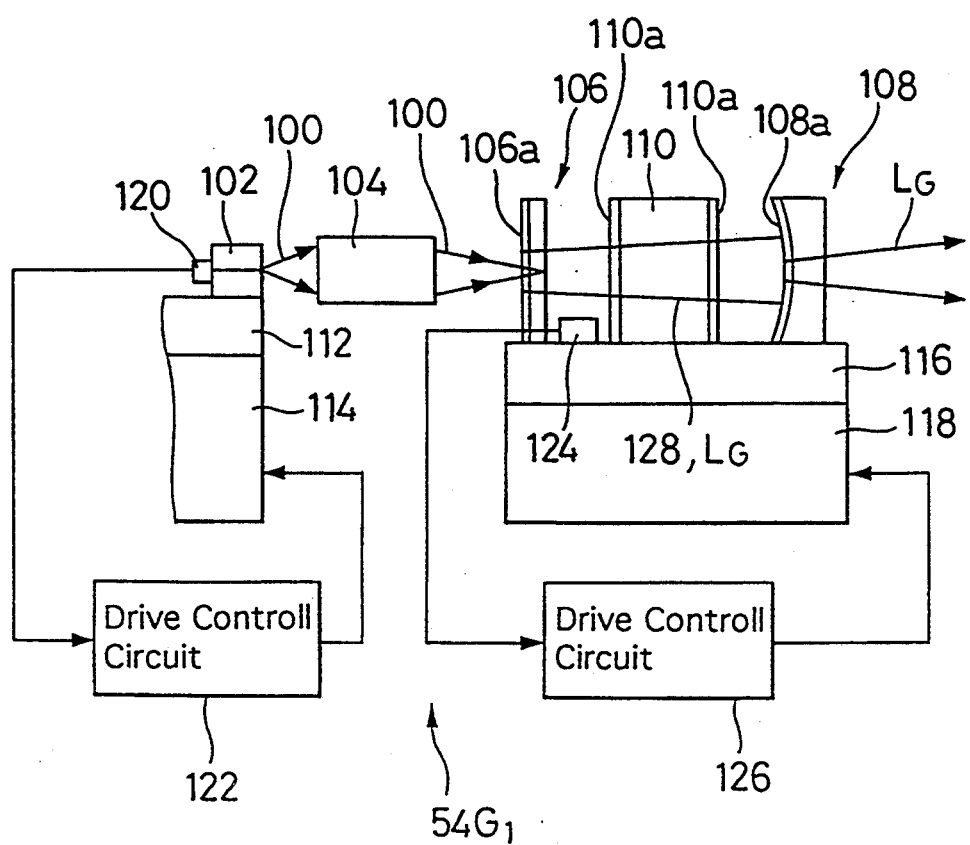
FIG. 3 illustrates one exemplary laser beam light source for green exposure in the exposure section of FIG. 2.

FIG. 3 schematically illustrates one example of the light source 54G adapted to emit a laser beam $L_G$ for exposing the G sensitive layer of the photosensitive material 20 therewith (sometimes referred to as G exposure).

The light source shown at $54G_1$ in FIG. 3 is a semiconductor laser excited or pumped solid laser including a semiconductor laser 102 adapted to emit a laser beam 100 at a wavelength 809 nm as excitation light, a gradient index (GRIN) lens or distributed index lens 104 for collecting the laser beam 100, a Nd:YVO$_4$ rod 106 in the form of a solid laser rod doped with neodymium (Nd), a resonator mirror 108, and a potassium titanate phosphate (KTP) crystal 110 disposed between the Nd:YVO₄ rod 106 and the resonator mirror 108 as a wavelength converting element.

In the illustrated light source 54G₁, the Nd:YVO₄ rod 106 is provided with a coating 106a which transmits a laser beam of 809 nm (transmittance higher than 99%), but reflects a laser beam of 1064 nm toward the KTP crystal 110 side (reflectance higher than 99.9%). The KTP crystal 110 on opposite sides is provided with anti-reflection coatings 110a for a laser beam of 1064 nm. The resonator mirror 108 on the side facing the KTP crystal 110 is provided with a coating 108a which reflects a laser beam of 1064 nm toward the KTP crystal 110 (reflectance higher than 99.9%), but transmits a laser beam of 532 nm (transmittance higher than 99%). In the illustrated light source 54G₁, a resonator is constructed by interposing the KTP crystal 110 as a wavelength converting element between the Nd:YVO₄ rod 106 and the resonator mirror 108 (at its reflective surface).

The semiconductor laser 102 is mounted on a heat sink 112 which is secured to a Peltier element 114 for maintaining the semiconductor laser 102 at a predetermined temperature. On the other hand, the respective parts forming the resonator are mounted on a heat sink 116 which is secured to a Peltier element 118 for maintaining the resonator parts at a predetermined temperature. The semiconductor laser 102 is provided with a temperature sensor 120 which is connected to a drive control circuit 122 for controlling the operation of the Peltier element 114. Also disposed on the heat sink 116 is a temperature sensor 124 which is connected to a drive control circuit 126 for controlling the operation of the Peltier element 118. With this construction, the semiconductor laser 102 is maintained at a predetermined temperature by the Peltier element 114 and the resonator composed of Nd:YVO₄ rod 106, resonator mirror 108 and KTP crystal 110 is maintained at a predetermined temperature by the Peltier element 118, ensuring precise operation of both the semiconductor laser 102 and the resonator without a temperature drift.

The drive control circuit 122, 126 associated with the Peltier element is not particularly limited in construction and, for example, it may be constructed from a reference voltage generator, comparator, and Peltier element driver and the like. In such an exemplary circuit, the comparator compares an output voltage from the temperature sensor 120 with a reference voltage from the reference voltage generator and delivers the differential voltage to the driver. The driver produces a power in proportion to the difference for driving the Peltier element for temperature control.

In the illustrated arrangement, the semiconductor laser 102 emits a laser beam 100 having a wavelength of 809 nm which is condensed by the GRIN lens 104 to enter the Nd:YVO₄ rod 106. Upon receipt of the laser beam 100 of 809 nm in wavelength, the Nd:YVO₄ rod 106 in which neodymium atoms are excited emits a laser beam 128 having a wavelength of 1064 nm.

Since the Nd:YVO₄ rod 106 is provided with the coating 106a which is transmissive to the laser beam 100 of 809 nm, but reflective to the laser beam 128 of 1064 nm and the resonator mirror 108 on the KTP crystal 110 side is provided with the coating 108a which is reflective to the laser beam 128 of 1064 nm, the laser beam 128 is confined and resonated therebetween to incur laser oscillation which is converted by the KTP crystal 110 into a second harmonic, that is, a laser beam L_G having a wavelength of 532 nm. Since the coating 108a on the resonator mirror 108 is transmissive to light of 532 nm, the laser beam L_G exits from the light source 54G₁ and reaches the dichroic mirror 64.

When the light source 54G₁ of the above-mentioned arrangement was driven by using a broad area/phased array laser having a power of 200 mW as the semiconductor laser 102 and controlling the temperature of the resonator and semiconductor laser 102 at a precision of ±0.01° C., it could produce a laser beam L_G of 1 mW in power and 532 nm in wavelength (circular Gaussian beam) over 8 hours at a stability within ±1% and a noise of 0.3% (DC 2 MHz).

The light source 54G₁ is not limited to the above-mentioned arrangement wherein the temperature control means are provided for both the semiconductor laser 102 and the resonator while either one of the semiconductor laser 102 and the resonator may be provided with the temperature control means. In the arrangement of the light source 54G₁, a laser beam L_G having a wavelength of 532 nm is equally produced by replacing the GRIN lens 104 by a lens system including a collimator lens 101, a pair of anamorphic prisms 103, and a condenser lens 105 as shown in FIG.

The light source used in the image forming method of the present invention is not limited to the one wherein the semiconductor laser and the wavelength conversion element or resonator are independently temperature controlled by separate temperature control means as in the example shown in FIG. 3. Another example is shown in FIG. 5 as a light source 54G₂ wherein the semiconductor laser and the wavelength conversion element or resonator are temperature controlled by a common temperature control means.

Figure 5:
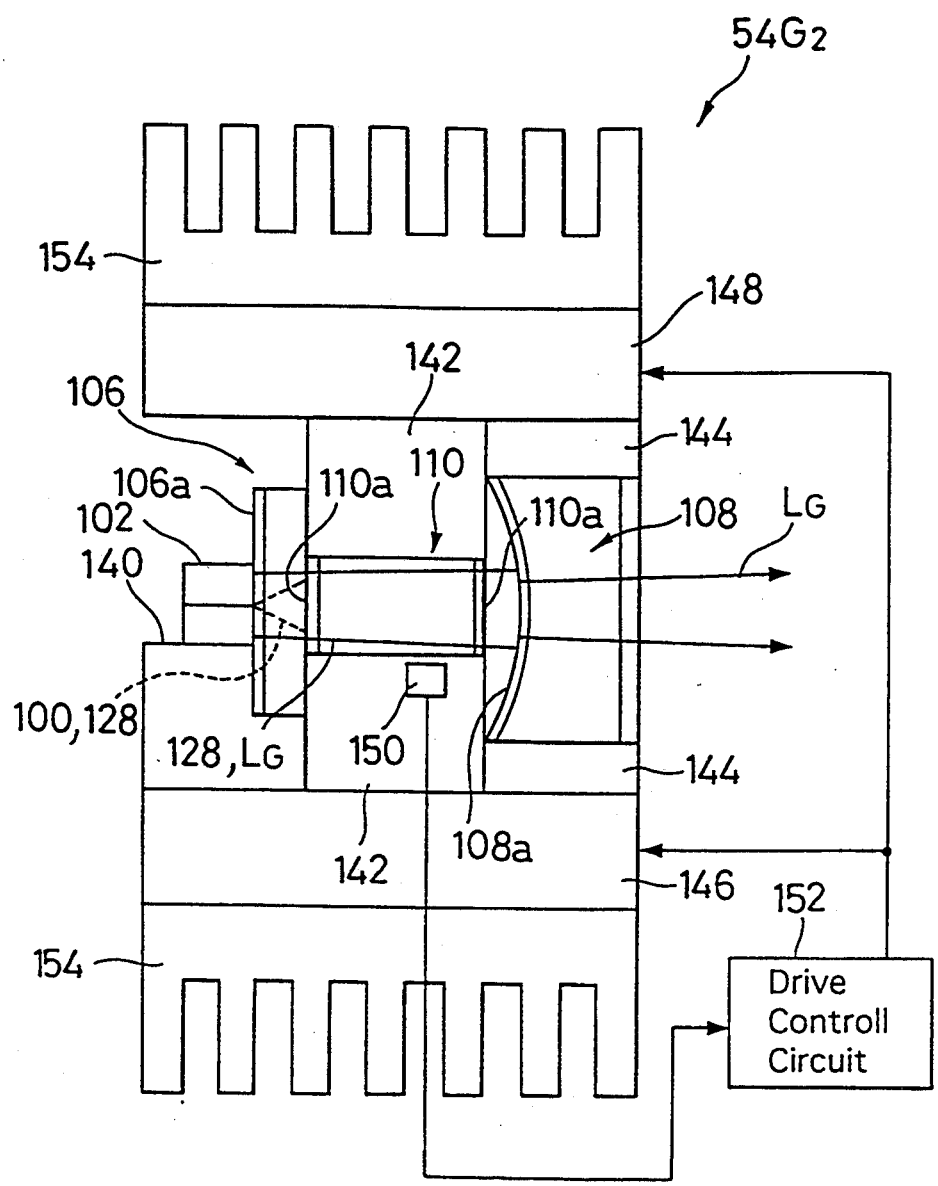
FIG. 5 illustrates a further exemplary laser beam light source for green exposure.

The light source 54G₂ shown in FIG. 5 includes a semiconductor laser 102, a Nd:YVO₄ rod 106, a KTP crystal 110, and a resonator mirror 108 wherein the KTP crystal 110 is interposed between the coatings on the surface of the Nd:YVO₄ rod 106 and the resonator mirror 108, the individual parts being the same as in the example of FIG. 3. Since the light source 54G₂ shown in FIG. 5 has basically the same arrangement and function as the light source 54G₁ shown in FIG. 3 except that the semiconductor laser and the wavelength conversion element are temperature controlled by a common temperature control means, the like parts are designated by the same numerals and their detailed description is omitted.

In the light source 54G₂, the semiconductor laser 102 emits a laser beam 100 having a wavelength of 809 nm which directly enters the Nd:YVO₄ rod 106. Being excited by the laser beam 100, the Nd:YVO₄ rod 106 emits a laser beam 128 having a wavelength of 1064 nm. The laser beam 128 incurs laser oscillation in the resonator and is converted by the KTP crystal 110 into a second harmonic, that is, a laser beam L_G having a wavelength of 532 nm, which exits from the resonator mirror 108.

In the light source 54G₂ shown in FIG. 5, the semiconductor laser 102 is secured on a mount 140, the Nd:YVO₄ rod 106 is adhesively joined to the end surface of a pair of mounts 142, 142 on the semiconductor laser 102 side, the KTP crystal 110 is clamped and secured between the pair of mounts 142, 142, and the resonator mirror 108 is clamped and secured between a pair of mounts 144, 144. Among the mounts 142 and 144, the lower mounts 142 and 144 are secured to a Peltier element 146 and the upper mounts 142 and 144 are secured to a Peltier element 148. The Peltier elements 146 and 148 are closely secured to heat sinks 154 and 154, respectively. A temperature sensor 150 is disposed on the mount 142 and connected to a drive control circuit 152 which is connected to the two Peltier elements 146 and 148. Then the two Peltier elements 146 and 148 are operated by the drive control circuit 152 such that the sensor 150 may detect a constant temperature.

In the light source 54G₂, the semiconductor laser 102 and the resonator (or wavelength converting element) including the KTP crystal 110 are always maintained at a predetermined temperature, ensuring precise operation of both the semiconductor laser 102 and the resonator without a temperature drift.

In the aforementioned light source 54G for emitting a laser beam $L_G$ corresponding to the G exposure, the solid laser rod is not limited to the aforementioned Nd:YVO₄ rod while it may be a Nd:YAG rod having an oscillation wavelength of 1064 nm, a LNP rod having an oscillation wavelength of 1047 nm, a Nd:GGG rod having an oscillation wavelength of 1064 nm, a Nd:GSGG rod having an oscillation wavelength of 1064 nm, a Nd:Glass rod having an oscillation wavelength of 1064 nm, or the like.

Also in the light source 54G, the wavelength converting element is not limited to the aforementioned KTP crystal while a single crystal having a polarization inversion periodic structure such as LiNbO₃, LiTaO₂, KNbO₃, and Mg:LiNbO₃, an organic non-linear crystal such as DMNP (3,5-dimethyl-1-(4-nitrophenyl)-pyrazole) and the like are equally useful.

Figure 6:
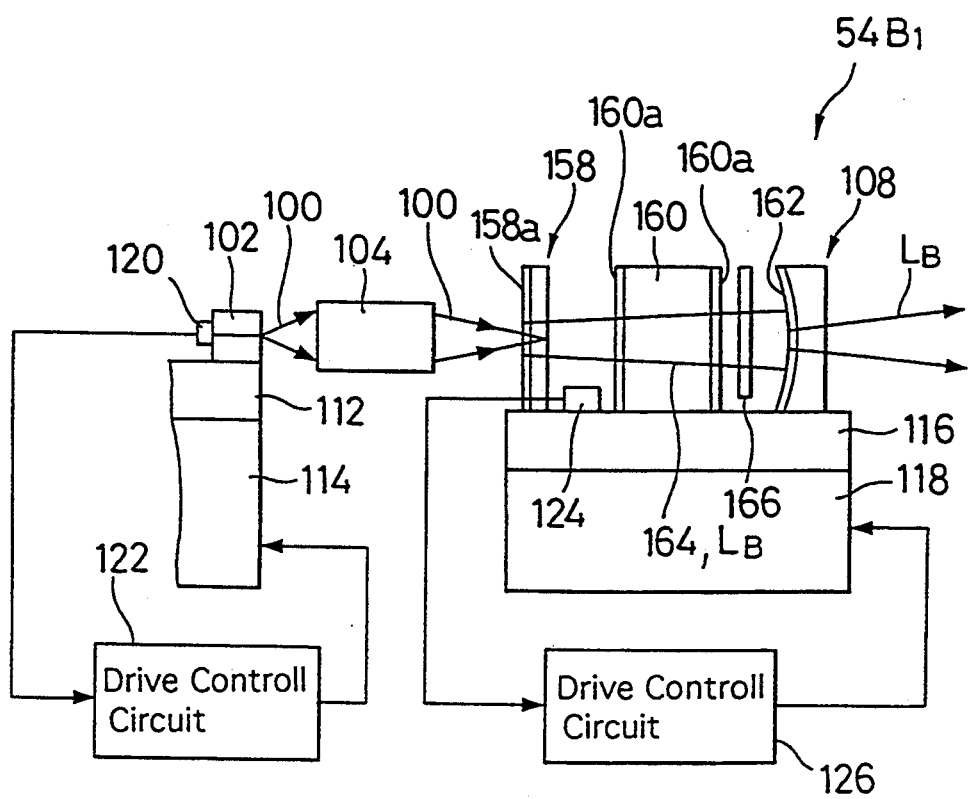
FIG. 6 illustrates one exemplary laser beam light source for blue exposure in the exposure section of FIG. 2.

FIG. 6 schematically illustrates one example of the light source 54B adapted to emit a laser beam $L_B$ for exposing the B sensitive layer of the photosensitive material therewith (sometimes referred to as B exposure). This light source 54B₁ shown in FIG. 6 is essentially of the same arrangement as the light source 54G₁ shown in FIG. 3 except that a Nd:YAG rod 158 is used as the solid laser rod and a KN (KNbO₃) crystal 160 is used as the wavelength conversion element. Like parts are designated by the same numerals and different portions are mainly described below.

In the illustrated light source 54B₁, the Nd:YAG rod 158 is provided with a coating 158a which transmits a laser beam of 809 nm, but reflects a laser beam of 946 nm toward the KN crystal 160 side. The KN crystal 160 on opposite sides is provided with anti-reflection coatings 160a for a laser beam of 946 nm. The resonator mirror 108 on the side facing the KN crystal 160 is provided with a coating 162 which reflects a laser beam of 946 nm toward the KN crystal 160, but transmits a laser beam of 473 nm. In the illustrated light source 54B₁, a resonator is constructed by interposing the KN crystal 160 as a wavelength converting element between the Nd:YAG rod 158 and the resonator mirror 108.

It is noted that an etalon plate 166 is inserted between the KN crystal 160 and the resonator mirror 108 for preventing longitudinal mode competition.

In the illustrated arrangement, the semiconductor laser 102 emits a laser beam 100 having a wavelength of 809 nm which is condensed by the GRIN lens 104 to enter the Nd:YAG rod 158. Upon receipt of the laser beam 100 of 809 nm in wavelength, the Nd:YAG rod 158 in which neodymium atoms are excited emits a laser beam 164 having a wavelength of 946 nm.

Since the Nd:YAG rod 158 is provided with the coating 158a which is transmissive to the laser beam 100 of 809 nm, but reflective to the laser beam 164 of 946 nm and the resonator mirror 108 on the KN crystal 160 side is provided with the coating 162 which is reflective to the laser beam 164 of 946 nm, the laser beam 164 is confined and resonated therebetween to incur laser oscillation which is converted by the KN crystal 160 into a second harmonic, that is, a laser beam $L_B$ having a wavelength of 473 nm. Since the coating 162 on the resonator mirror 108 is transmissive to light of 473 nm, the laser beam $L_B$ exits from the light source 54B₁ and enters the mirror 66.

When the light source 54B₁ of the above-mentioned arrangement was driven by using a broad area/phased array laser having a power of 500 mW as the semiconductor laser 102 and controlling the temperature of the resonator and semiconductor laser 102 at a precision of ±0.01° C., it could produce a laser beam $L_B$ of 1 mW in power and 473 nm in wavelength (circular Gaussian beam) over 8 hours at a stability within ±1% and a noise of 0.4% (DC 2 MHz).

Figure 4:
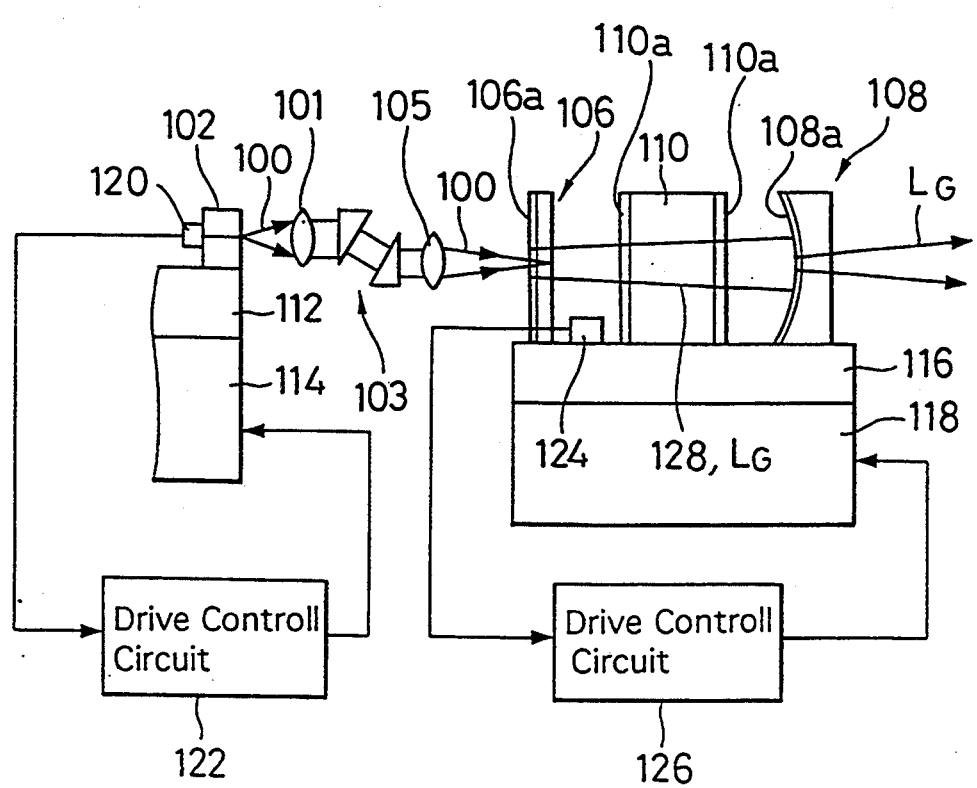
FIG. 4 illustrates another exemplary laser beam light source for green exposure.

In the light source 54B₁ shown in FIG. 6, the temperature control means is not limited to the illustrated ones while various other examples of the temperature control means are useful as in the aforementioned light source 54G. The GRIN lens 104 may be replaced by a lens system including a collimator lens 101 and a pair of anamorphic prisms 103 as shown in FIG. 4.

In the aforementioned light source 54B for emitting a laser beam $L_B$ corresponding to the B exposure, the solid laser rod is not limited to the aforementioned Nd:YAG rod while it may be a Nd:YVO₄ rod having an oscillation wavelength of 914 nm or the like. Also in the light source 54B, the wavelength converting element is not limited to the KN crystal while a single crystal having a polarization inversion periodic structure such as LiNbO₃, LiTaO₂, KNbO₃, Mg:LiNbO₃, and KTP, an organic non-linear crystal such as DMNP and the like are equally useful.

Moreover, the light sources 54G and 54B can also be light sources in which the solid laser rod itself has a wavelength conversion function. For example, NYAB having oscillation wavelengths of 1062 nm (531 nm) and 914 nm (457 nm) and Nd:MgO:LiNbO₃ having oscillation wavelengths of 1094 nm (547 nm) and 914 nm (457 nm) may be advantageously used for such purposes. Note that values in parentheses represent the wavelength of second harmonic by a SHG element.

The light source 54R corresponding to R exposure may be selected from various semiconductor lasers having an oscillation wavelength corresponding to the R sensitive layer in the photosensitive material. For example, a GaAlInP laser having an oscillation wavelength of 683 nm, a $In_{\frac{1}{2}}(Ga_{1-x}Al_x)_{\frac{1}{2}}P$ laser wherein $0<x<1$ and the wavelength is a function of x or the like may be advantageously used. It is, of course, preferred that these semiconductor lasers are temperature controlled by Peltier elements or the like.

The laser beam light sources used in the image forming method of the present invention have an operating temperature which can be set within a relatively wide range although the operating temperature is preferably set in the range of about 0° C. to about 40° C. The precision of temperature control of the light sources (including semiconductor lasers, resonators and the like) by the temperature control means should preferably be within ±1° C. centering at the set operating temperature. The precision of temperature control within this range enables to provide a stable laser output, ensuring that images of higher quality free of variable density are formed. More preferably, the precision of temperature control is within ±0.5° C. especially within ±0.1° C. centering at the set operating temperature.

The temperature control means may be selected from well-known means capable of temperature adjustment at such a precision. Exemplary controls are Peltier elements as used in the illustrated examples and heat-up arrangements utilizing a precise thermistor and a heater. Peltier elements as in the illustrated examples are preferred because they allow the operating temperature of a semiconductor laser or resonator (wavelength conversion element) to be set near room temperature and minimize the over-shading upon temperature control.

Also the light sources used herein may include at least one λ/4 plate for preventing polarization mode competition in a resonator or an etalon plate for preventing longitudinal mode competition.

Referring to FIG. 1 again, the photosensitive material 20 which has completed image exposure with the laser beam in the exposure section 50 is then subject to a color development process by sequentially feeding it through the developing tank 12, bleach-fixing tank 14, washing tank 16, water removal section 17, and drying section 18.

The developing tank 12, bleach-fixing tank 14, washing tank 16, water removal section 17, and drying section 18 include plural pairs of conveyor rollers 24 for feeding the photosensitive material 20 through each processing section in a clamping manner. The pairs of conveyor rollers 24 in the water removal section 17 also serve for removing water droplets from the photosensitive material 20 as by squeezing or absorption.

The photosensitive material 20 is fed forward by the paired conveyor rollers 24 with the emulsion side faced downward so that it is immersed in the respective processing solutions for a predetermined time whereby it undergoes color development.

The developing tank 12, bleach-fixing tank 14, washing tank 16 are provided at a proper position with injectors 30 each for injecting the processing solution to create a high speed jet flow in the processing tank. To this end, pumps 32 are disposed in fluid communication with the injectors 30 and the developing tank 12, bleach-fixing tank 14, washing tank 16, respectively, so that each processing solution is circulated by the pump 32 and injected against the photosensitive material 20 through the injector 30.

The image forming method of the present invention has the advantage that the color generation density experiences minimal variation and the image stability after exposure is improved over the prior art image forming method. It is thus preferable to carry out development immediately after the completion of exposure. It is also possible to carry out high speed development. For enabling rapid image formation, the image forming method of the invention is preferably designed to carry out image exposure and color development such that color development starts within 60 seconds after the completion of image exposure with a laser beam and the overall color development process is completed within 120 seconds.

EXAMPLE

Examples of the present invention are given below by way of illustration and not by way of limitation.

Example 1

A multilayer color photographic paper of the layer arrangement shown below was prepared by starting with a paper support having polyethylene laminated on either surface, treating the paper support with a corona discharge, forming a gelatin undercoat layer containing sodium dodecylbenzenesulfonate, and coating various photographic layers.

Coating solutions were prepared as follows.

Preparation of the Fifth Layer Coating Solution

An emulsified dispersion was prepared by dissolving 32.0 g of a cyan coupler (ExC), 3.0 g of a color image stabilizer (Cpd-2), 2.0 g of a color image stabilizer (Cpd-4), 18.0 g of a color image stabilizer (Cpd-6), 40.0 g of a color image stabilizer (Cpd-7), and 5.0 g of a color image stabilizer (Cpd-8) in 50 cc of ethyl acetate and 14.0 g of a solvent (Solv-6), adding the solution to 500 cc of a 20% gelatin aqueous solution containing 8 cc of sodium dodecylbenzenesulfonate, and effecting emulsification and dispersion by a ultrasonic homogenizer.

Separately, a silver chlorobromide emulsion of cubic grain system was prepared. It was a 1:4 (silver molar ratio) mixture of large and small size emulsions. The large size emulsion had a mean grain size of 0.58 μm and a grain size distribution with a coefficient of variation of 0.09. The small size emulsion had a mean grain size of 0.45 μm and a grain size distribution with a coefficient of variation of 0.11. Both the emulsions had 0.6 mol % of silver bromide locally attached to the grain surface. Both the emulsions had a red sensitive sensitizing dye E (shown below) added thereto in an amount of $0.9 \times 10^{-4}$ mol per mol of silver for the large size emulsion and $1.1 \times 10^{-4}$ mol per mol of silver for the small size emulsion. The emulsions were chemically ripened by adding sulfur and gold sensitizing agents.

The emulsified dispersion and the red-sensitive silver chlorobromide emulsion were mixed for dissolution so as to form a fifth layer coating solution of the composition shown below.

Coating solutions for the first to fourth, sixth and seventh layers were prepared by the same procedure as the fifth layer coating solution. The gelatin hardener used in each layer coating solution was sodium 1-oxy-3,5-dichloro-s-triazine.

To each layer coating solution was added color image stabilizers (Cpd-10) and (Cpd-11) in such amounts as to provide a total amount of 25.0 mg/m² and 50 mg/m², respectively.

The silver chlorobromide emulsion for each photosensitive emulsion layer used the following spectral sensitizing dye.

TABLE 6

Blue-sensitive emulsion layer

Sensitizing dyes A and B were used.

Sensitizing dye A

TABLE 6-continued
Blue-sensitive emulsion layer

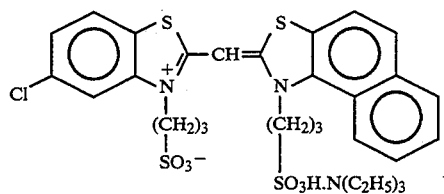

Sensitizing dye B

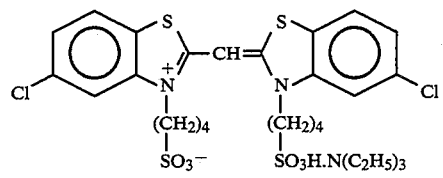

(The amount of each dye per mol of silver halide was $2.0 \times 10^{-4}$ mol for the large size emulsion and $2.0 \times 10^{-4}$ mol for the small size emulsion.)

TABLE 7
Green-sensitive emulsion layer

Sensitizing dyes C and D were used.

Sensitizing dye C

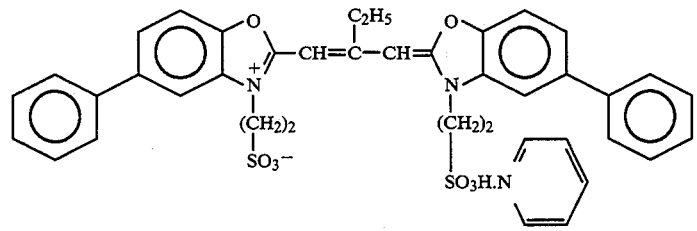

(The amount of dye C per mol of silver halide was $4.0 \times 10^{-4}$ mol for the large size emulsion and $5.6 \times 10^{-4}$ mol for the small size emulsion.)

Sensitizing dye D

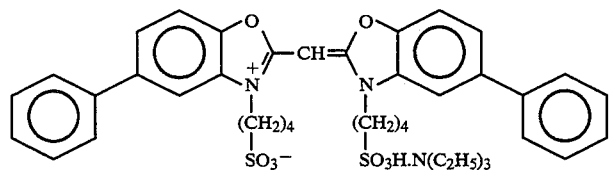

(The amount of dye D per mol of silver halide was $7.0 \times 10^{-5}$ mol for the large size emulsion and $1.0 \times 10^{-5}$ mol for the small size emulsion.)

TABLE 8
Red-sensitive emulsion layer

Sensitizing dye E

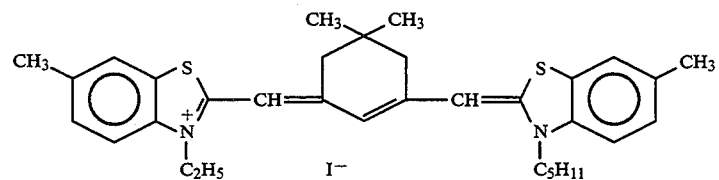

(The amount of dye E per mol of silver halide was $0.9 \times 10^{-4}$ mol for the large size emulsion and $1.1 \times 10^{-4}$ mol for the small size emulsion. The following compound was further added in an amount of $2.6 \times 10^{-3}$ mol per mol of silver halide.)

TABLE 8-continued

Red-sensitive emulsion layer

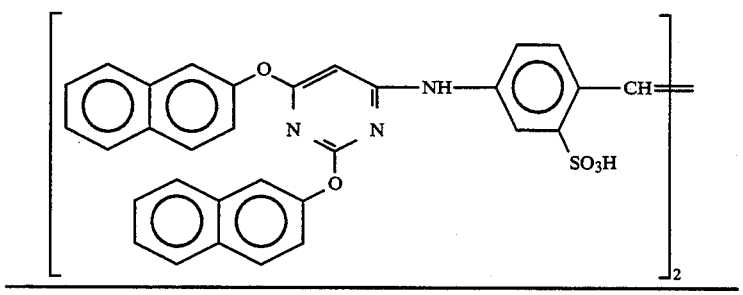

To the blue (B), green (G) and red (R) sensitive emulsion layers, 1-(5-methylureidophenyl)-5-mercaptotetrazole was added in an amount of $8.5 \times 10^{-5}$ mol, $7.7 \times 10^{-4}$ mol, and $2.5 \times 10^{-4}$ mol per mol of silver halide, respectively.

To the blue and green sensitive emulsion layers, 4-hydroxy-6-methyl-1,3,3a,7-tetraazaindene was added in an amount of $1 \times 10^{-4}$ mol and $2 \times 10^{-4}$ mol per mol of silver halide, respectively.

The following four dyes were added to the emulsion layer for anti-irradiation purpose (values in the parentheses represent the coating weight).

[Formula 1]

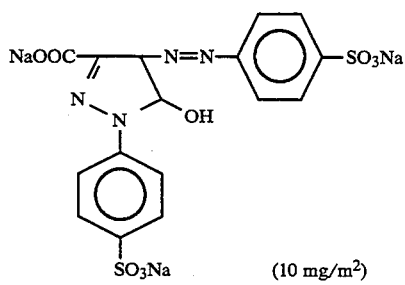

(10 mg/m²)

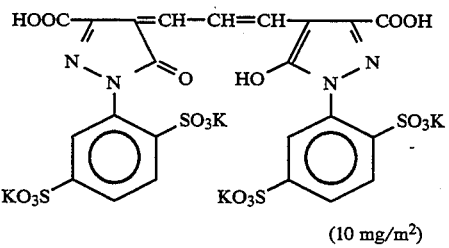

(10 mg/m²)

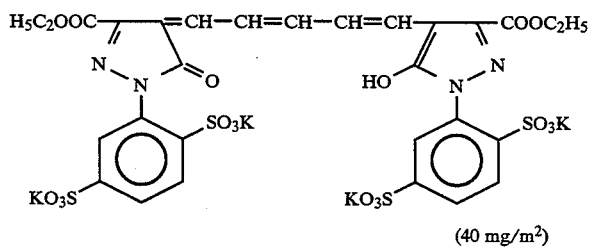

(40 mg/m²)

and

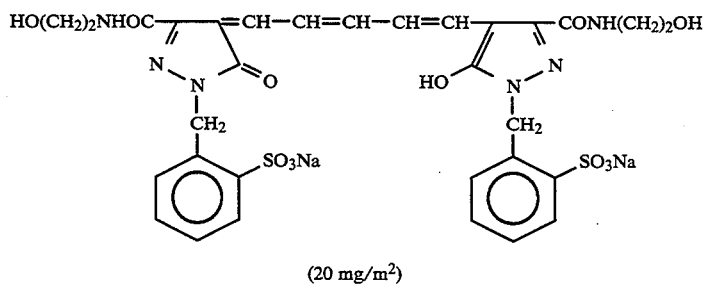

(20 mg/m²)

Layer Arrangement

The composition of each layer is shown below. Numerals represent the coating weight (g/m$^2$). The coating weight of a silver halide emulsion is that calculated as silver.

Support

Polyethylene laminated paper in which the polyethylene coating on the first layer side contains a white pigment (TiO$_2$) and a bluish dye (ultramarine).

| First layer (blue-sensitive emulsion layer) | |
|---|---|
| Silver chlorobromide emulsion | 0.30 |
| (cubic, a 3:7 (silver molar ratio) mixture of large and small size emulsions having a mean grain size of 0.88 and 0.70 μm, respectively. Their grain size distributions had a coefficient of variation of 0.08 and 0.10, respectively. Both the emulsions had 0.3 mol % of silver bromide locally attached to the grain surface.) | |
| Gelatin | 1.22 |
| Yellow coupler (ExY) | 0.82 |
| Color image stabilizer (Cpd-1) | 0.19 |
| Solvent (Solv-3) | 0.18 |
| Solvent (Solv-7) | 0.18 |
| Color image stabilizer (Cpd-7) | 0.06 |
| Second layer (color amalgamation inhibiting layer) | |
| Gelatin | 0.64 |
| Anti-amalgamation agent (Cpd-5) | 0.10 |
| Solvent (Solv-1) | 0.16 |
| Solvent (Solv-4) | 0.08 |
| Third layer (green-sensitive emulsion layer) | |
| Silver chlorobromide emulsion | 0.12 |
| (cubic, a 1:3 (silver molar ratio) mixture of large and small size emulsions having a mean grain size of 0.55 and 0.39 μm, respectively. Their grain size distributions had a coefficient of variation of 0.10 and 0.08, respectively. Both the emulsions had 0.8 mol % of silver bromide locally attached to the grain surface.) | |
| Gelatin | 1.28 |
| Magenta coupler (ExM) | 0.23 |
| Color image stabilizer (Cpd-2) | 0.03 |
| Color image stabilizer (Cpd-3) | 0.16 |
| Color image stabilizer (Cpd-4) | 0.02 |
| Color image stabilizer (Cpd-9) | 0.02 |
| Solvent (Solv-2) | 0.40 |
| Fourth layer (UV absorbing layer) | |
| Gelatin | 1.41 |
| UV absorbing agent (UV-1) | 0.47 |
| Anti-amalgamation agent (Cpd-5) | 0.05 |
| Solvent (Solv-5) | 0.24 |
| Fifth layer (red-sensitive emulsion layer) | |
| Silver chlorobromide emulsion | 0.23 |
| (cubic, a 1:4 (silver molar ratio) mixture of large and small size emulsions having a mean grain size of 0.58 and 0.45 μm, respectively. Their grain size distributions had a coefficient of variation of 0.09 and 0.11, respectively. Both the emulsions had 0.6 mol % of silver bromide locally attached to the grain surface.) | |
| Gelatin | 1.04 |
| Cyan coupler (ExC) | 0.32 |
| Color image stabilizer (Cpd-2) | 0.03 |
| Color image stabilizer (Cpd-4) | 0.02 |
| Color image stabilizer (Cpd-6) | 0.18 |
| Color image stabilizer (Cpd-7) | 0.40 |
| Color image stabilizer (Cpd-8) | 0.05 |
| Solvent (Solv-6) | 0.15 |
| Sixth layer (UV absorbing layer) | |
| Gelatin | 0.48 |
| UV absorbing agent (UV-1) | 0.16 |
| Anti-amalgamation agent (Cpd-5) | 0.02 |
| Solvent (Solv-5) | 0.08 |
| Seventh layer (protective layer) | |
| Gelatin | 1.10 |
| Acryl-modified polyvinyl alcohol copolymer (modification 17%) | 0.17 |
| Liquid paraffin | 0.03 |

The agents used herein are identified below.

[Formula 2]

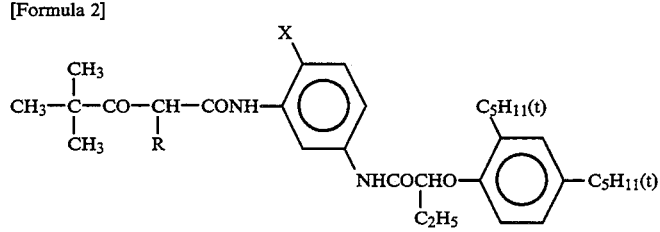

(ExY) Yellow coupler a 1:1 (molar ratio) mixture of:

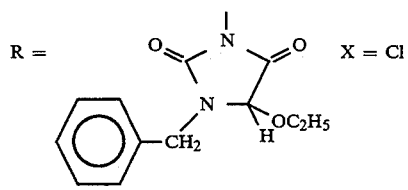

R =     X = Cl and

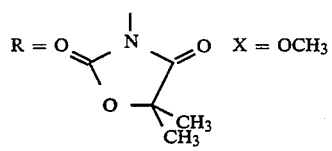

R =     X = OCH$_3$ (ExM) Magenta coupler
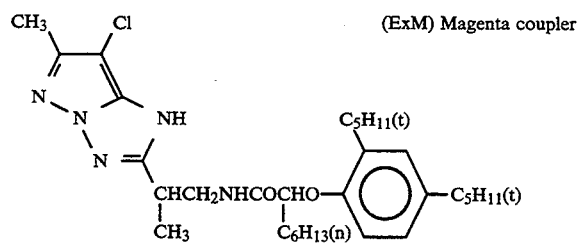
a 1:1 (molar ratio) mixture of
(ExC) Cyan coupler
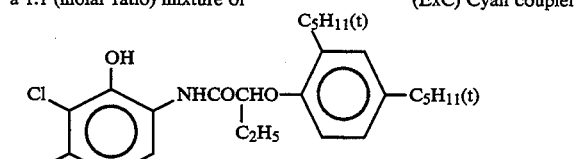
and
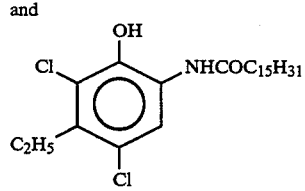
(Cpd-5) Color image stabilizer
a 2:4:4 (weight ratio) mixture of the followings.
(Cpd-6) Color image stabilizer
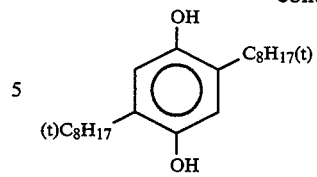
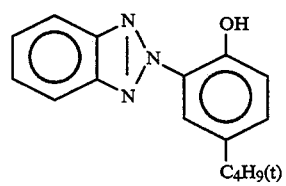
[Formula 4]
(Cpd-1) Color image stabilizer
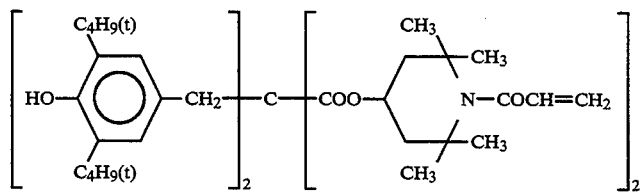
(Cpd-2) Color image stabilizer
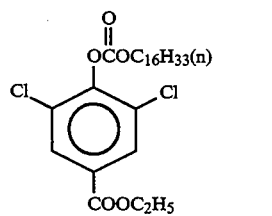
(Cpd-3) Color image stabilizer
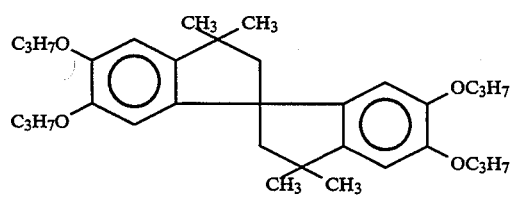
(Cpd-4) Color image stabilizer
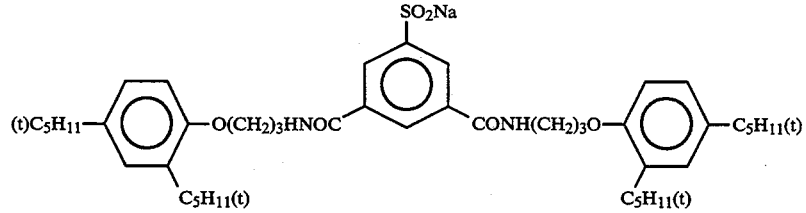
[Formula 5]

-continued

[Structure: benzotriazole-N-phenol with C4H9(sec) and C4H9(t) substituents]

—(CH₂—CH)ₙ—
          |
          CONHC₄H₉(t)
Average molecular weight 60,000

(Cpd-7) Color image stabilizer

[Formula 6]
a 1:1 (weight ratio) mixture of the followings.

[Structure: hydroquinone with C₁₆H₃₃(sec) and Cl substituents]

and

[Structure: chlorophenol with C₁₄H₂₉(sec)]

(Cpd-8) Color image stabilizer

[Structure: bis(hydroxyphenyl)methane derivative with CH₃ groups and isopropyl bridge]

(Cpd-9) Color image stabilizer

[Formula 7]
a 4:2:4 (weight ratio) mixture of the followings.

[Structure: benzotriazole-phenol with C₅H₁₁(t) groups]

(UV-1) UV absorber

[Structure: chloro-benzotriazole-phenol with C₄H₉(t) groups]

[Structure: benzotriazole-phenol with C₄H₉(sec) and C₄H₉(t) groups]

[Formula 8]

-continued

[Structure: phthalate with COOC₄H₉ groups]   (Solv-1) Solvent a 1:1 (volume ratio) mixture of the followings.

$O=P[-O-C_6H_4-C_3H_7(iso)]_3$   (Solv-2) Solvent $O=P[-O-C_6H_4-CH_3]_3$ $O=P[-O-C_9H_{19}(iso)]_3$   (Solv-3) Solvent $O=P[-O-C_6H_4-CH_3]_3$   (Solv-4) Solvent

COOC₈H₁₇
|
(CH₂)₈
|
COOC₈H₁₇

[Formula 9]
a 80:20 (volume ratio) mixture of the followings.

[Structure: dicyclohexyl phthalate]   (Solv-6) Solvent and

C₈H₁₇CHCH(CH₂)₇COOC₈H₁₇
    \O/

C₈H₁₇CHCH(CH₂)₇COOC₈H₁₇   (Solv-7) Solvent
    \O/

The thus prepared photosensitive material is designated Sample No. 101.

This photosensitive material was measured for the spectral sensitivity maximum wavelength of each of the emulsion layers using an energy spectral sensitivity sensitometer manufactured by Fuji Photo-Film Co., Ltd. The sample was first subjected to spectral exposure in the visible light region of from 400 nm to 750 nm in wavelength for an exposure time of 1/30 sec. The sample was then subjected to color development using the following steps and processing solutions.

| Step | Temp. | Time | Replen-isher* | Tank volume |
|---|---|---|---|---|
| Color development | 35° C. | 45 sec. | 161 ml | 17 l |

-continued

| Step | Temp. | Time | Replenisher* | Tank volume |
|---|---|---|---|---|
| Bleach-fix | 30–35° C. | 45 sec. | 215 ml | 17 l |
| Rinse 1 | 30–35° C. | 20 sec. | — | 10 l |
| Rinse 2 | 30–35° C. | 20 sec. | — | 10 l |
| Rinse 3 | 30–35° C. | 20 sec. | 350 ml | 10 l |
| Dry | 70–80° C. | 60 sec. | | |

*Replenisher amount is per square meter of photosensitive material. Rinse water follows a three tank counterflow from rinse tank 3 to rinse tank 1.

Each of the processing solutions used in these steps had the following formulation.

| | Tank solution | Replenisher |
|---|---|---|
| Color developer | | |
| Water | 800 ml | 800 ml |
| Ethylenediamine-N,N,N,N-tetra-methylenesulfonic acid | 1.5 g | 2.0 g |
| Potassium bromide | 0.015 g | — |
| Triethanol amine | 8.0 g | 12.0 g |
| Sodium chloride | 1.4 g | — |
| Potassium carbonate | 25.0 g | 25.0 g |
| N-ethyl-N-(β-methanesulfonamidoethyl)3-methyl-4-aminoaniline hydrogen sulfate | 5.0 g | 7.0 g |
| N,N-bis(carboxymethyl)hydrazine | 4.0 g | 5.0 g |
| 1Na N,N-di(sulfoethyl)hydroxylamine | 4.0 g | 5.0 g |
| Fluorescent brightener (WHITEX 4B, Sumitomo Chemical K.K.) | 1.0 g | 2.0 g |
| Water totaling to | 1000 ml | 1000 ml |
| pH (25° C.) | 10.05 | 10.45 |
| Bleach-fixer (tank solution and replenisher had the same formulation) | | |
| Water | 400 ml | |
| Ammonium thiosulfate (70%) | 100 ml | |
| Sodium sulfite | 17.0 g | |
| Ammonium iron (III) ethylenediamine-tetraacetate | 55.0 g | |
| Disodium ethylenediaminetetraacetate | 5.0 g | |
| Ammonium bromide | 40.0 g | |
| Water totaling to | 1000 ml | |
| pH (25° C.) | 6.0 | |

Rinse solution (tank solution and replenisher had the same formulation)
deionized water (calcium and magnesium each less than 3 ppm)

Figure 7:
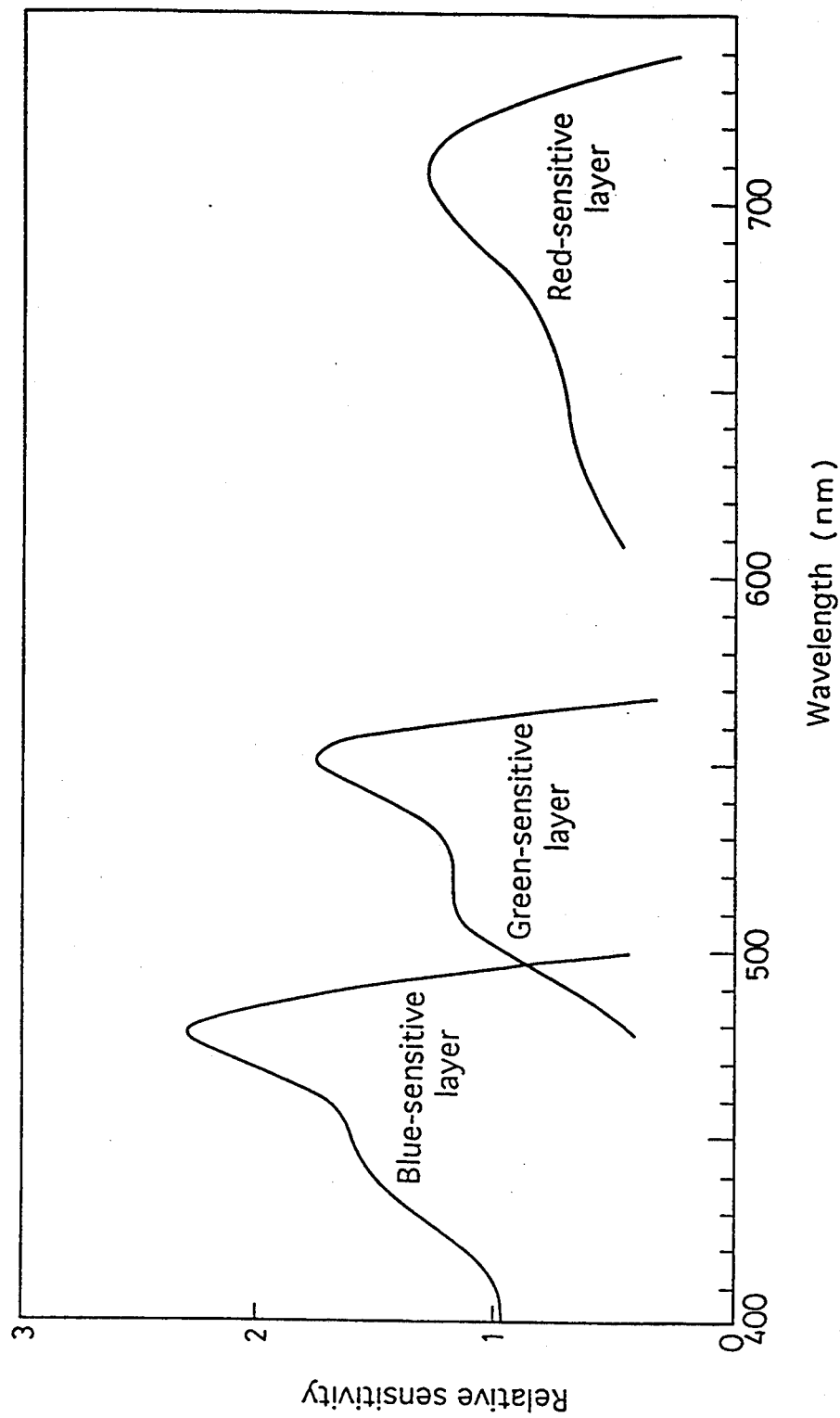
FIG. 7 is a graph showing spectral sensitivity distribution curves that the photosensitive material used in the image forming method of the invention exhibits.

The spectral sensitivity distribution curves of the processed sample are shown in FIG. 7. The respective emulsion layers had the following spectral sensitivity maximum wavelength.

| Emulsion layer | Spectral sensitivity maximum wavelength |
|---|---|
| Blue-sensitive emulsion layer | 477 nm |
| Green-sensitive emulsion layer | 550 nm |
| Red-sensitive emulsion layer | 709 nm |

Next, the exposure apparatus 50 shown in FIG. 2 was fabricated by combining the aforementioned light sources and other components as follows.

| | Light source of laser beam $L_B$ | Light source of laser beam $L_G$ | Light source of laser beam $L_R$ |
|---|---|---|---|
| Exposure apparatus 50A | light source $54B_1$ (FIG. 6) wavelength 473 nm | light source $54G_1$ (FIG. 3) wavelength 532 nm | TOLD9200 by Toshiba K.K. wavelength 670 nm |
| Exposure apparatus 50B | light source $54B_1$ (FIG. 6) wavelength 473 nm (temperature control of resonator not operated) | light source $54G_1$ (FIG. 3) wavelength 532 nm | TOLD9200 by Toshiba K.K. wavelength 670 nm |
| Exposure apparatus 50C | light source $54B_1$ (FIG. 6) wavelength 473 nm (temperature control of resonator not operated) | light source $54G_1$ (FIG. 3) wavelength 532 nm (temperature control of resonator not operated) | TOLD9200 by Toshiba K.K. wavelength 670 nm |

Using each of the exposure apparatus 50A, 50B and 50C, Sample No. 101 was subjected to scanning exposure so that gray color might generate at a density of 1.0, examining the occurrence of density variation. Each light source was operated for continuous emission and each laser beam was modulated by the acoustooptic modulator 58.

The color development was the same as in the measurement of the spectral sensitivity distribution. The results are shown in Table 1.

TABLE I

| Exposure apparatus | Observation |
|---|---|
| 50A (invention) | little density variation |
| 50B (comparison) | yellowish and bluish variations along the primary scanning direction |
| 50C (comparison) | yellowish/bluish and magenta/greenish variations along the primary scanning direction |

The benefits of the present invention are evident from these data.

There has been described an image forming method for recording an image in a photosensitive material having spectral sensitivity in the visible region using as a laser beam light source at least one semiconductor laser excited solid laser composed of a semiconductor laser and a non-linear optical element for producing a laser beam of visible light. The laser beam light source is continuously operated while maintaining it at a predetermined temperature. The laser beam emitted by the light source is modulated by an external modulator in accordance with the image to be formed. Among the laser beam light sources, at least two laser beam light sources produce laser beams having a wavelength falling within ±20 nm from the maximum wavelength in the spectral sensitivity distribution of the corresponding photosensitive layers. Each photosensitive layer has a spectral sensitivity distribution with a peak width of up to 40 nm.

Then the image forming method of the invention allows the laser beam light source to oscillate to provide a constant output without on/off and a sudden intensity change of laser oscillation in the laser beam light source. Additionally, since the semiconductor laser and the wavelength conversion element are maintained at a constant temperature, a laser beam of a constant power is available in a very stable manner without a droop or mode hopping phenomenon.

Since each photosensitive layer has a spectral sensitivity distribution with a peak width of up to 40 nm and at least two laser beams have a wavelength falling within ±20 nm centering at the maximum wavelength in the spectral sensitivity distribution of the corresponding photosensitive layers, image recording can be done in the high sensitivity region of the photosensitive material having high spectral sensitivity so that even with high speed exposure, an image having a satisfactory density of color generation and hence of quality can be recorded.

Also since a laser beam of visible light is provided by a wavelength conversion element which generates a second harmonic, the laser beam is free of wavelength variation so that an image can be formed in the photosensitive material having a sharp spectral sensitivity peak as mentioned above without a variation in color generation density which is otherwise caused by a wavelength shift of the light source.

Therefore, the image forming method of the present invention enables to form an image in a conventional photosensitive material having spectral sensitivity in the visible region using a cost effective optical system including a semiconductor laser while the resulting image has a satisfactory density of color generation, is free of a density variation, and hence has high quality.

Obviously many modifications and variations of the present invention are possible in the light of the above teachings. It is therefore to be understood that within the scope of the appended claims the invention may be practiced otherwise than as specifically described.

We claim:

1. A method for forming an image in a photosensitive material having at least one layer for each of a yellow dye-forming silver halide photosensitive layer, a magenta dye-forming silver halide photosensitive layer, and a cyan dye-forming silver halide photosensitive layer on a support, comprising the step of:

subjecting said photosensitive material to image exposure by scanning exposure using laser beams corresponding to the spectral sensitivity distribution of the respective photosensitive layers, and subjecting said exposed photosensitive material to color development, wherein at least one of the photosensitive layers in said photosensitive material has a spectral sensitivity distribution with a peak width of up to 40 nm, among the combinations of said yellow dye-forming silver halide photosensitive layer, said magenta dye-forming silver halide photosensitive layer, and said cyan dye-forming silver halide photosensitive layer with laser beams used for exposure of the respective layers, at least two of said photosensitive layers are each subjected to a laser beam having a wavelength falling within ±20 nm of the range of the maximum wavelength in the spectral sensitivity distribution of each respective photosensitive layer, at least one semiconductor laser excited solid laser having a semiconductor laser and a wavelength conversion element both of which are equipped with a temperature control means is used as a light source for producing the laser beam, and the laser beam light source continuously emits a laser beam which is modulated by an optical modulator before it reaches the photosensitive material for exposure.

2. An image forming method according to claim 1 wherein said semiconductor laser excited solid laser has a wavelength conversion function built therein.

3. An image forming method according to claim 1 wherein at least one of the photosensitive layers in said photosensitive material is spectrally sensitized with a J-band type sensitizing dye.

4. An image forming method according to claim 1 wherein said color development is effected within 60 seconds from the end of image exposure by said laser beams and the overall color development step is completed within 120 seconds.

* * * * *